United States Patent Office 3,546,235
Patented Dec. 8, 1970

---

3,546,235
CERTAIN SUBSTITUTED 1,2-DITHIOL-3-ONES
Jörg Bader, Arlesheim, Basel-Land, and Karl Gätzi, Basel, Switzerland, assignors to Geigy Chemical Corporation, Ardsley, N.Y., a corporation of New York
No Drawing. Continuation-in-part of application Ser. No. 555,994, June 8, 1966. This application June 5, 1967, Ser. No. 643,359
Claims priority, application Switzerland, June 18, 1965, 8,566/65; May 23, 1966, 7,421/66
Int. Cl. C07d *31/50*
U.S. Cl. 260—294.8                3 Claims

ABSTRACT OF THE DISCLOSURE 1,2-dithiol-3-ones having substituents which comprise certain organic radicals bonded to the 5-position of the dithiolone nucleus via a sulphur atom which may be mono- or dioxidized, which are of excellent microbicidal activity especially against fungi and bacteria; a novel process for the production of those of the new compounds in which the bridge is a sulphur or mono-oxidized sulphur bridge; methods of inhibiting microbial growth with the aid of the novel compounds, and antimicrobial compositions containing the latter as active ingredients.

CROSS REFERENCE TO RELATED APPLICATION

This application is a continuation-in-part of our patent application Ser. No. 555,994, filed June 8, 1966, now abandoned.

BACKGROUND OF THE INVENTION

Field of the invention

The present invention concerns new sulphur-containing 1,2-dithiol-3-ones which comprise in the 5-position substitutents which are bonded thereto via a sulphur atom, an —SO— or an —SO$_2$— bridge (i.e., 1,2-dithiol-3-one-5-sulphides, -5-sulphoxides and -5-sulphones) and have microbicidal properties, processes for the production of these compounds, compositions containing them as active ingredients, and their use for the control of microorganisms, particularly of fungi and bacteria, in the protection of plants and materials.

Description of the prior art

It is known from the literature that the ring system of 1,2-dithiol-3-one can easily be disrupted by nucleophilic reactants, particularly in a strongly alkaline medium (cf. F. Boberg, Liebigs Annalen der Chemie, 666, 88 [1963]; 679, 118 [1964]; Angewandte Chemie 73, 579 [1961]; 74, 495 [1962]; 76, 575 [1964]). An exchange of the chlorine atom in the 5-position in 5-chloro-1,2-dithiol-3-ones for another substituent whilst maintaining the ring system has only been described up to the present for the radicals of certain organic amines. In this known exchange reaction generally a great part of the 5-chloro-1,2-dithiol-3-one used in decomposed by rupture of the ring [F. Boberg and A. Marei, Liebigs Ann. Chem. 666, 88 (1963); F. Boberg, Liebigs Ann. Chem. 681, 169 (1965)].

SUMMARY OF THE INVENTION

It has now been found that, suprisingly, 5-halogen-1,2-dithiol-3-ones, especially 5-chloro-1,2-dithiol-3-ones, react readily and with good yields with thiols or, in the case of strongly acid thiols their alkali metal, alkaline earth metal or ammonium salts, or with thiones or with salts of sulphinic acids which are nucleophilic reactants. In the reaction, the halogen atom in the 5-position is exchanged without the heterocyclic ring system being disrupted, and new 1,2-dithiol-3-ones substituted in the 5-position via an S atom or —SO$_2$— group, or, after oxidation of the —S— atom, an —SO— or —SO$_2$— group are obtained which are of the formula

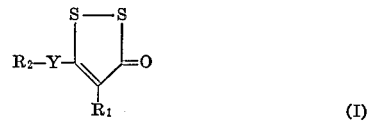

In this formula:

Y represents sulphur or the sulphinyl or sulphonyl group,
R$_1$ represents a halogen atom having an atomic number of at most 35, a lower alkyl radical or an unsubstituted or substituted phenyl radical,
R$_2$ represents an unsubstituted or substituted aliphatic hydrocarbon radical, or a carbocyclic or heterocyclic radical which is preferably mononuclear, or an unsubstituted or substituted preferably mononuclear carbocyclic or heterocyclic radical fused with an unsubstituted or substituted benzene nucleus, and when Y is sulphur, also the group

wherein Q represents the amino group or a substituted amino group, the pyrrolidino, piperidino, morpholino or hexamethylenimino radical, an alkoxy radical or an unsubstituted or substituted lower aliphatic hydrocarbon radical, and E represents oxygen, sulphur, the imino group or an alkylated imino group, with the proviso that when R$_1$ represents an unsubstituted or substituted phenyl radical, R$_2$ represents an unsubstituted or substituted aliphatic hydrocarbon radical.

Because of their excellent antimicrobial properties, expecially their fungicidal, fungistatic, bactericidal and bacteriostatic properties, the new sulphur-containing 1,2-dithiol-3-ones of the general Formula I are suitable for combatting phytopathogenic fungi on plants, and fungi and bacteria which damage and destroy organic materials and useful objects, as well as for the protection of plants against attack by fungi. The new active substances can also be used for soil disinfection. Their toxicity for warm-blooded animals is remarkably low.

The new compounds also act as systemic fungicides. Because of these properties, plants treated with the new 1,2-dithiol-3-ones are given wider and longer-lasting protection from attack by fungi. The new active substances can also be used for the treatment of seeds without germination being affected. For use in plant protection, the new active substances are made into compositions with distributing agents and/or carriers in the usual way and applied to the plants in concentrations of active substance within the range of 0.01 and 10% by weight calculated on the weight of the composition.

In addition the new compounds of general Formula I are also suitable for combatting microorganisms which damage and destroy organic materials and can thus be used for the protection of such materials. Fungi and bacteria are meant by such microorganisms which attack, in particular, keratine materials, those containing cellulose (wood, fabrics, leather, etc.) synthetic materials and those which are applied by painting. By impregnating with solutions or dispersions of active substance having a content of active substance of at least 1 g./litre, the materials and useful objects are given a good and long-lasting protection. For this purpose, the active substances can also be used in combinatioin with other substances suitable for the protection of material.

DETAILED DESCRIPTION OF THE INVENTION AND OF PREFERRED EMBODIMENTS THEREOF

According to the present invention, microbicidally active 1,2-dithiol-3-ones substituted in the 5-position by way of an S atom or an —SO— or —SO$_2$— group, are obtained by reacting a 5-halogen-1,2-dithiol-3-one with hydrogen compounds of divalent sulphur in the presence of a solvent or diluent and, if desired, oxidising the 5-thioethers so obtained with an oxidising agent to form the corresponding sulphinyl or sulphonyl compounds. The preferred 5-halogen-1,2-dithiol-3-ones usable according to the invention are those which contain chlorine or bromine in the 5-position and a substitutent which is inert under the reaction conditions in the 4-position. Examples of the latter are halogen having an atomic number of at most 35 or an unsubstituted or substituted phenyl radical, whereby substituents of this radical must also be stable under the reaction conditions.

Both organic and also inorganic compounds having an SH— group or a thiono group which can be converted into such can be used according to the invention as hydrogen compounds of divalent sulphur. Such orgainc compounds correspond to the formula R$_2$—SH, wherein R$_2$ represents an unsubstituted or substituted aliphatic, homocyclic or heterocyclic radical, those condensed with an unsubstituted or substituted benzene nucleus also being understood by homocyclic and heterocyclic radicals. In addition, R$_2$ can represent the group

wherein Q represents an alkoxy radical, an unsubstituted or substituted amino group, the pyrrolidino, piperidino, morpholino or hexamethylenimino radical, a substituted or unsubstituted lower aliphatic radical, and E represents oxygen, sulphur, the imino group or an alkylated imino group. Examples of compounds which contain such a grouping are organic mono- and di-thiocarboxylic acids, organic dithiocarbamic acids and dithiocarbonic acid-O-esters, which are to be used for the reaction, in particular, as salts, e.g., as ammonium or alkali metal salts. Organic thiols or thiones which can be converted into such can be used both as such as well as salts for the process according to the invention. Inorganic and organic compounds having an SH— group are, e.g., the thiosulphates and thiourea. On reacting thiosulphates with a 5-halogen-1,2-dithiol-3-one, the corresponding bis-[1,2-dithol-3-on-5-yl]-sulphide is formed as reaction product.

As solvents or diluents for the process according to the invention, water, organic solvents such as aromatic hydrocarbons, chlorinated aromatic and aliphatic hydrocarbons, alcohols, ketones, esters, ethers, amides, sulphoxides and mixtures of the solvents mentioned can be used. The reaction temperatures lie between —70 and 200° C., preferably between —40 and 120° C.

To attain good yields of 1,2-dithiol-3-on-5-yl sulphides, it is advantageous to perform the process according to the invention in an acid to weakly alkaline reaction medium. In some cases, it is of advantage to perform the reaction in the presence of an acid binding agent. Salts of weak acids such as carbonates, acetates, borates, phosphates; metal oxides such as magnesium oxide and zinc oxide; tertiary amines such as trialkylamines, mixtures of amines and salts of amines can be used as acid binding agents. Acids such as acetic acid, phosphoric acid, etc. can be used to reduce the basicity of a strongly alkaline reaction medium.

The thioethers of 1,2-dithiol-3-ones obtained according to the process of the invention can be oxidised to form the corresponding sulphinyl compounds. The following oxidising agents, for example, can be used for the oxidation of the 5-thio-derivatives: hydrogen peroxide, organic per acids such as peracetic acids, monoperphthalic acid, performic acid, perbenzoic acid, 3-chloro-perbenzoic acid, trifluoroperacetic acid, inorganic peracids, e.g., Caro's acid, peroxydisulphuric acid and their salts. The per acids mentioned can be used for the reaction as such or they can be produced, however, at the site of the reaction from hydrogen peroxide and the corresponding acids, optionally in the presence of a catalyst such as mineral acid. In general, the use of equimolar amounts of oxidising agent is advantageous. If desired, the thio-derivatives or sulphinyl compounds can be oxidised to form the sulphonyl compounds.

1,2-dithiol-3-one-5-thioethers of general Formula II

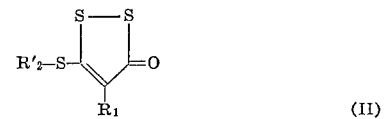

wherein R$_1$ has the meanings given in Formula I and R'$_2$ represents an unsubstituted or substituted aliphatic radical, a heterocyclic radical or a heterocyclic radical bound by way of an alkylene bridge, particularly a methylene bridge, can also be obtained by reacting a 1,2-dithiol-3-one of the general Formula III

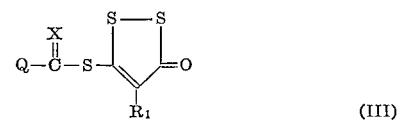

wherein R$_1$, X and Q have the meanings given in Formula I, with a compound of general Formula IV $$R'_2—Z— \qquad (IV)$$

wherein R'$_2$ has the meaning given in Formula II and Z represents a reactive halogen atom or an aliphatic sulphonyloxy radical.

5-thioethers of 1,2-dithiol-3-ones of the general Formula V

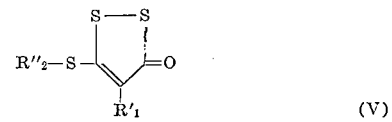

wherein

R'$_1$ represents an unsubstituted or substituted phenyl radical, and

R''$_2$ represents an unsubstituted or substituted aliphatic radical, may also be prepared by oxidising a 5-thioether of a 1,2-dithiol-3-thione of the general Formula VI

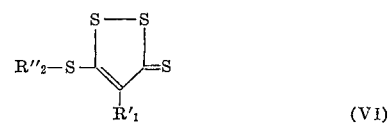

wherein R'$_1$ and R''$_2$ have the meanings given above with an oxidising agent to form the corresponding compound of the general Formula V.

As oxidising agent can be used, for example, mercury-(II)-acetate or potassium permanganate.

The reaction is performed in the presence of an inorganic solvent stable under the reaction conditions such as acetone and chloroform and at temperatures ranging from —10 to 50° C., preferably from 0 to 25° C.

In general, the new 1,2-dithiol-3-ones of general formula I are crystalline compounds. If these new sulphur compounds have reactive substituents such as exchangeable halogen, or hydroxyl, amino, mercapto, carboxyl groups, etc., then the reactions usual for the corresponding function can be performed, e.g., etherification, esterification, saponification, alkylation, etc.

It is generally advantageous to use an equimolar amount of the oxidising agent in the reaction with thioethers of 1,2-dithiolones falling under Formula I.

Compounds falling under Formula I in which Y represents —SO₂— are produced by oxidising a thioether of 1,2-dithiol-3-one, of the formula

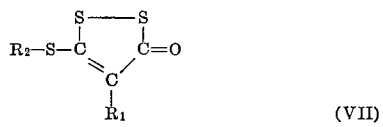

(VII)

wherein R₁ and R₂ have the same meanings as in Formula I using two moles or more of the above-mentioned oxidising agents in lieu of one required in producing the corresponding sulphoxides.

On the other hand, compounds of Formula I in which Y represents —SO₂— are also obtained by reacting a compound of the formula

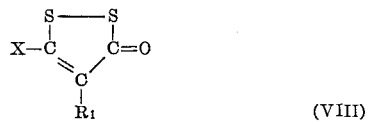

(VIII)

wherein R₁ has the meaning given in Formula I, and X represents a halogen atom,
with a sulphinic acid salt of the formula

(IX)

wherein R₂ has the meaning given in Formula I, and
Z represents the equivalent of a metal atom cation preferably an alkali metal or alkaline earth metal cation, or the ammonium ion.

Iron, zinc or aluminum salts of Formula III can also be used.

When R₁ in the compounds of Formula I is a halogen atom, chlorine is the preferred halogen. A phenyl radical symbolised by R₁ can contain substituents which are inert under the reaction conditions, e.g., halogen having an atomic weight of less than 100, or lower alkyl. By aliphatic hydrocarbon radicals symbolised by R₂ are meant straight and branched chain alkyl and alkenyl radical having 1 to 20 carbon atoms; the optionally condensed homocyclic and heterocyclic radical can be saturated, partly unsaturated or aromatically unsaturated. Preferred examples from this class are:

(a) Of aromatic homocycles, particularly the phenyl radical, also the radicals of naphthalene or tetraline which, optionally, can be bound by way of a methylene group to Y, and (b) of heterocycles, the 5- or 6-membered rings optionally bound to Y by way of an alkylene bridge, particularly a methylene bridge, which rings have 1 to 3 hetero atoms, in particular nitrogen, oxygen or sulphur atoms, e.g., the radicals of the following heterocycles: furan, thiophene, pyridine, oxazole, thiazole, imidazole, 1,2-dithiol-3-one, oxadiazoles, thiadiazoles, triazines and also their partially and exhaustively hydrogenated derivatives and their derivatives containing a fused benzo radical, e.g., the benzoxazolyl or benzimidazolyl radical.

The radicals symbolised by R₂ can have one or more substituents which are inert under the reaction conditions. Such substituents are, e.g., the following:

Halogen, hydroxyl, acyloxy, alkylsulphonyloxy, amino, alkylamino, dialkylamino, cyano, carboxyl, carbamoyl, thiocarbamoyl, alkylcarbamoyl, dialkylcarbamoyl, benzylcarbamoyl, alkoxycarbonyl, alkoxyalkoxycarbonyl, halogenalkoxycarbonyl, acyl, ammonio, alkylammonio, trialkylammonio, benzyl-dialkylammonio, alkoxy, alkylthio, halogenalkyl, optionally substituted phenyl or phenoxy radicals, heterocyclic radicals such as the piperazino or morpholino radical.

Compounds of Formula I bearing substituents which are capable of salt formation with acids, e.g., the amino or dialkylamino group or the trialkylammonio group, or with bases, e.g., a carboxyl or a phenolic hydroxyl group, can also be in the form of their salts and are then of the same utility as mentioned hereinbefore.

Preferred compounds falling under Formula I in which Y represents sulphur are those of the formula

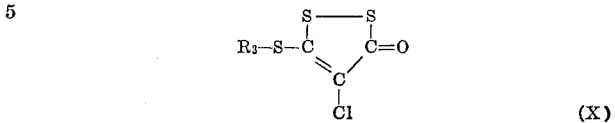

(X)

wherein R₃ represents lower alkyl, chloro-lower alkyl, hydroxy-lower alkyl, lower alkanoyloxy-lower alkyl, chloro-lower alkanoyloxy-lower alkyl, lower alkyl-sulphonyloxy-lower alkyl, lower alkanoyl-lower alkyl, benzoyl-lower alkyl, lower alkanoyl-amino-lower alkyl, amino-lower alkyl, N-alkylated amino-lower alkyl, morpholino-lower alkyl, piperidino-lower alkyl, lower alkanoyl, N-lower alkyl-substituted amino-thiocarbonyl, morpholino-thiocarbonyl, piperidino-thiocarbonyl, pyrrolidino-thiocarbonyl, lower alkoxy-thiocarbonyl, imidazolinyl, chloro-dithiolonyl, thenyl, chloro-thenyl, lower alkyl-thiazolyl-lower alkyl, pyridyl-lower alkyl, carbamoyl-lower alkyl, N-alkylated carbamoyl-lower alkyl, alkoxycarbonyl-lower alkyl wherein alkoxy has from 1 to 12 carbon atoms, carboxyl-lower alkyl, lower alkoxy-lower alkoxy-carbonyl-lower alkyl, cycloalkyloxycarbonyl-lower alkyl, thienyl, thiadiazolyl, mercapto-thiodiazolyl, amino-thiadiazolyl, lower alkylthio-thiadiazolyl, oxazolyl, benzoxazolyl, oxazolinyl, thiazolyl, lower alkyl-thiazolyl, lower alkyl-thiazolyl-lower alkyl, lower alkoxy-carbonyl-lower alkyl thiazolyl, thiazolinyl, benzimidazoyl, pyridyl, N-oxido-pyridyl, lower alkoxy-substituted 1′,3′,5′-triazinyl or 2′-chloro-4′-lower alkoxy-1′,3′,5′-triazinyl-(6′), or mono- to tricyclic cycloalkyl of from 5 to 10 carbon atoms.

Other compounds falling under Formula X of similar good antimicrobial properties are those in which R₃ represents acetamido-thiadiazolyl, dialkylformylimino-thiadiazolyl, oxadiazolyl or lower alkyl-oxadiazolyl.

Preferred compounds falling under Formula I in which Y represents —SO— or —SO₂— are those of the formula

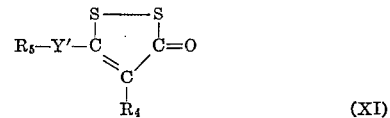

(XI)

wherein Y′ represents —SO— or —SO₂—,
R₄ represents chlorine or lower alkyl, and
R₅ represents lower alkyl, chloro-lower alkyl, hydroxy-lower alkyl, lower alkanoyloxy-lower alkyl, chloro-lower alkanoyloxy-lower alkyl, lower alkyl-sulfonyl-oxy-lower alkyl, lower alkanoyl-lower alkyl, benzoyl-lower alkyl, lower alkanoyl-amino-lower alkyl, N-alkylated amino-lower alkyl, morpholino-lower alkyl, phenyl-lower alkyl, lower alkyl-phenyl-lower alkyl, chloro-phenyl-lower alkyl, bromo-phenyl-lower alkyl, nitro-phenyl-lower alkyl, naphthyl-lower alkyl, phenyl, lower alkyl-phenyl, chloro-phenyl, bromophenyl, nitrophenyl, carboxy-phenyl, alkoxycarbonylphenyl, hydroxyphenyl, lower alkanoyl-oxyphenyl, aminophenyl, methoxyphenyl, naphthyl, thenyl, chloro-thenyl, lower alkylthiazolyl-lower alkyl, pyridyl-lower alkyl, carbamoyl-lower alkyl, N-alkylated carbamoyl-lower alkyl, alkoxycarbonyl-lower alkyl wherein alkoxy has from 1 to 12 carbon atoms, carboxyl-lower alkyl, lower alkoxy-lower alkoxy-carbonyl-lower alkyl, cycloalkyloxycarbonyl-lower alkyl, thienyl, thiadiazolyl, aminothiadiazolyl, benzoxazolyl, lower alkyl-thiazolyl, lower alkyl-thiazolyl-lower alkyl, lower alkoxy-carbonyl-lower alkyl-thiazolyl, phenyl thiazolyl, benzothiazolyl, benzimidazolyl, pyridyl, benzimidazolyl-lower alkyl, pyridyl-lower alkyl, lower alkoxy-substituted 1′,3′,5′-triazinyl or 2′-chloro-4′-lower alkoxy-1′,3′,5′-triazinyl-(6′), or mono- to tricyclic cycloalkyl of from 5 to 10 carbon atoms.

Most preferred compounds falling under Formula XI in which $R_4$ is halogen or lower alkyl, and Y is $-SO_2-$ are those of the formula

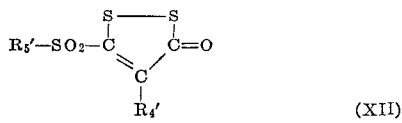
(XII)

wherein $R_4'$ represents halogen or lower alkyl, and
$R_5'$ represents lower alkyl, phenyl, lower alkyl-substituted phenyl, thienyl, lower alkyl-substituted thienyl, pyridyl or lower alkyl-substituted pyridyl.

Most preferred compounds falling under Formula XI in which $R_4$ is a phenyl or lower alkyl-phenyl radical are those of the formula

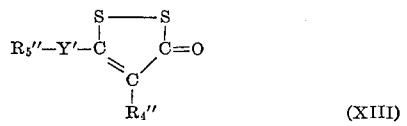
(XIII)

wherein Y' represents $-SO-$ or $-SO_2-$,
$R_4''$ represents phenyl or lower alkyl-phenyl, and
$R_5''$ represents lower alkyl.

Preferred salts falling under Formula I are those of the formula

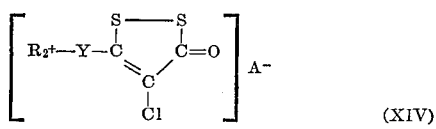
(XIV)

wherein Y represents $-S-$, $-SO-$ or $-SO_2-$,
$R_2^+$ represents N-alkylated ammonio-lower alkyl or N-benzyl ammonio-lower alkyl, and
$A^-$ represents the equivalent of a monovalent anion.

The invention is further illustrated by the following nonlimitative examples. Where not expressly stated otherwise, parts and percentages are given by weight. The temperatures are in degrees centigrade.

EXAMPLE 1

A total of 18.7 parts of 4,5-dichloro-1,2-dithiol-3-one is added in portions within 10 minutes to 14.46 parts of p-chlorothiophenol, 50 parts by volume of water and 50 parts by volume of ethanol, the addition being made while stirring. During the addition, the inner temperature is kept at 15–20° by cooling. The whole is then stirred for 10 hours at room temperature after which it is filtered and the filter residue is recrystallised from methyl Cellosolve/hexane mixture. 24.8 parts (85% of the theoretical) of pure (4-chloro-1,2-dithiol-3-on-5-yl)-(4'-chlorophenyl)-sulphide are obtained, M.P. 128°.

EXAMPLE 2

41.5 parts of 2-phenyl-ethyl mercaptan are added dropwise to a suspension of 33.7 parts of magnesium carbonate and 56.1 parts of 4,5-dichloro-1,2-dithiol-3-one in 250 parts by volume of ethanol, the addition being made within 75 minutes while stirring at an inner temperature of 5–10°. The whole is then stirred for 12 hours at room temperature after which it is filtered. The filter residue is extracted with benzene. The filtrate is evaporated under reduced pressure and the evaporation residue is also extracted with benzene. The combined benzene extracts are concentrated to a small volume. On cooling, 80.9 parts (93.4% of the theoretical) of pure (4-chloro-1,2-dithiol-3-on-5-yl)-(2'-phenylethyl)-sulphide crystallise out, M.P. 85.5–86.5°.

EXAMPLE 3

A solution of 18.71 parts of 4,5-dichloro-1,2-dithiol-3-one in 70 parts by volume of dimethyl formamide is cooled to −70°. 22.23 parts of 2-mercapto pyridine are added all at once and the mixture is stirred without cooling until it has attained room temperature. The reaction product precipitates during this time in long fine needles which are filtered off and washed with water. This first crystallisate weighs 21 parts. On diluting the mother liquor with water, another 4.5 parts of (4-chloro-1,2-dithiol-3-on-5-yl)-(2'-pyridyl)-sulphide are obtained.

The total yield is 25.5 parts (97% of the theoretical). The melting point is 148–149.5°.

EXAMPLE 4

42.1 parts of thioglycolic acid ethyl ester are quickly added to a suspension of 98.7 parts of barium carbonate and 56.1 parts of 4,5-dichloro-1,2-dithiol-3-one in 300 parts by volume of 96% ethanol, the addition being made while stirring at an inner temperature of −10°. An exothermic reaction immediately takes place. The temperature is prevented from rising above 20° by cooling. On completion of the main reaction, the whole is stirred for 3 hours at room temperature and then filtered. The filter residue is washed twice with 250 parts by volume of methylene chloride each time and then thrown away. The combined filtrates are concentrated under reduced pressure to a small volume. On cooling, 61.3 parts (75.5% of the theoretical) of pure (4-chloro-1,2-dithiol-3-on-5-yl)-(ethoxy-carbonylmethyl)-sulphide crystallise out; M.P. 56–57°.

EXAMPLE 5

27.5 parts by volume of about 80% aqueous thioglycolic acid are added all at once to a suspension of 37.4 parts of 4,5-dichloro-1,2-dithiol-3-one in 150 parts by volume of methanol, the addition being made while stirring at −40° to −50°. The mixture is then stirred for another 12 hours, the temperature being gradually brought to room temperature. It is then filtered. The filter residue is washed with a little methanol, dried and extracted with 250 parts by volume of hot chloroform. The chloroform extract is evaporated and the evaporation residue is recrystallised from methanol. 27.2 parts (53.0% of the theoretical) of pure (4-chloro-1,2-dithiol-3-on-5-yl)-(methoxy-carbonylmethyl)-sulphide are obtained; M.P. 99–100.5°. 15.3 parts (31.5% of the theoretical) of (4-chloro-1,2-dithiol-3-on-5-yl)-(carboxymethyl) - sulphide (M.P. 203–205°), were insoluble in chloroform.

If the same reaction is performed in water, then (4-chloro-1,2-dithiol-3-on-5-yl)-(carboxymethyl)-sulphide is obtained as sole reaction product. It can be converted into the methyl ester in the usual way, e.g., by reaction with methanol in the presence of mineral acid.

EXAMPLE 6

A solution of 22.65 parts of 2-mercapto benzoxazole and 8.10 parts of sodium methylate in 90 parts by volume of ethanol is poured within 3 minutes into a solution of 30 parts of 4,5-dichloro-1,2-dithiol-3-one in a mixture of 60 parts by volume of acetone and 60 parts by volume of ethylene glycol monomethyl ether, the addition being made while stirring at an inner temperature of −20°. The solution is then seeded whereupon the product quickly crystallises out. After one hour standing at room temperature, it is filtered off and washed first with a little acetone and then with a large quantity of water. The crude product is recrystallised from ethylene glycol monomethyl ether. The yield of (4-chloro-1,2-dithiol-3-on-5-yl)-benzoxazolyl-(2')-sulphide, M.P. 138°, is 37.0 parts (82% of the theoretical).

EXAMPLE 7

A solution of 51.1 parts of ethylene thiourea and 93.5 parts of 4,5-dichloro-1,2-dithiol-3-one in 600 parts by volume of ethylene glycol monomethyl ether is heated for 20 hours at 60–70°. After cooling, it is filtered. The filter residue is dissolved in a warm mixture of 100 parts by volume of water and 400 parts by volume of chloroform.

The aqueous phase is extracted with 200 parts by volume of fresh chloroform, treated with charcoal and evaporated. The evaporation residue is treated with 100 parts by volume of warm ethylene glycol monomethyl ether. 93 parts (64% of the theoretical) of (4-chloro-1,2-dithiol-3-on-5-yl)-(imidazolin-2'-yl) - sulphide hydrochloride remain undissolved. The product decomposes at 160–175° depending on the rapidity with which it is heated. The chloroform extracts are evaporated and the residue is recrystallised several times from ethylene glycol monomethyl ether. 6 parts (7% of the theoretical) of bis-(4-chloro-1,2-dithiol-3-on-5-yl)-sulphide are obtained; M.P. 112°.

EXAMPLE 8

A solution of 8.5 parts of piperidine, 7.6 parts of carbon disulphide and 5.4 parts of sodium methylate in 100 parts by volume of ethanol are added dropwise to a suspension of 18.7 parts of 4,5-dichloro-1,2-dithiol-3-one in 50 parts by volume of acetone and 80 parts by volume of ethanol, the addition being made within 2 hours while stirring at an inner temperature of −30° to −40°. On completion of the dropwise addition, the whole is stirred for another 2 hours without cooling, whereupon it is then cooled to −40° and filtered. The filter residue is washed with water and recrystallised from ethylene glycol monomethyl ether to which about 10% of water are added. 20.0 parts (64% of the theoretical) of pure (4-chloro-1,2-dithiol-3-on-5-yl)-(piperidino-thiocarbonyl) - sulphide are obtained; M.P. 120°.

EXAMPLE 9

100 parts by volume of ethanol and 30.5 parts of carbon disulphide are added to a solution of 16.8 parts of potassium hydroxide in 20 parts by volume of water. The mixture obtained is added within 10 minutes to a suspension of 56.1 parts of 4,5-dichloro-1,2-dithiol-3-one in 80 parts by volume of ethanol the addition being made within 10 minutes while stirring and cooling with ice. The whole is stirred for another 10 minutes at room temperature, filtered and the filter residue is dissolved in as little as possible hot benzene. This solution is treated with charcoal and allowed to crystallise. 40.0 parts (49% of the theoretical) of (ethoxy-thiocarbonyl)-(4-chloro-1,2-dithiol-3-on-5-yl)-sulphide are obtained; M.P. 96–101°. A sample again recrystallised from benzene melts at 99–101°. The benzene mother liquors are evaporated and the residue is recrystallised from ethylene glycol monomethyl ester. 12.4 parts (25% of the theoretical) of bis-(4-chloro-1,2-dihtiol-3-on-5-yl)-sulphide are obtained; M.P. 112°.

EXAMPLE 10

A mixture of 2.7 parts of (ethoxy-thiocarbonyl)-(4-chloro-1,2-dithiol-3-on-5-yl)-sulphide, 5.4 parts of ethyl iodide and 10 parts by volume of ethanol is heated for 2 hours at 80°. A clear solution is formed. On cooling, 1.8 parts (85% of the theoretical) of 4-chloro-5-ethylthio-1,2-dithiol-3-one crystallise out; M.P. 102–104°.

EXAMPLE 11

A mixture of 3.1 parts of (piperidino-thiocarbonyl)-(4-chloro-1,2-dithiol-3-on-5-yl)-sulphide, 3.4 parts of benzyl bromide and 10 parts by volume of ethylene glycol monomethyl ether is heated for 3 hours at 80°. The solution formed is then poured into water. The product precipitates in crystalline form and is liberated from benzyl bromide by boiling out with a little ethanol. 2.3 parts (84% of the theoretical) of 4-chloro-5-benzylthio-1,2-dithiol-3-one are obtained; M.P. 98°.

EXAMPLE 12

28.9 parts of (4-chloro-1,2-dithiol-3-on-5-yl)-(imidazolin-2'-yl)-sulphide hydrochloride, 19.9 parts of ω-bromoacetophenone, 30 parts by volume of ethanol and 40 parts by volume of water are stirred for 4 hours at 80°. The hot mixture is filtered. The filter residue is washed with methanol and water and then recrystallised from ethylene glycol monomethyl ether. 19.9 parts (65% of the theoretical) of (4-chloro-1,2-dithiol-3-on-5-yl) - (benzoylmethyl)-sulphide are obtained in this way; M.P. 142°.

The sulphides of 1,2-dithiol-3-ones given in the following Table I are produced in the manner described in Examples 1 to 12 by reacting a 4-chloro- or 4-aryl-5-chloro-1,2-dithiol-3-one with a thiol or a salt of a thiol.

TABLE I

| No. | Compound | Melting Point in °C. |
|---|---|---|
| 1 | (4-chloro-1,2-dithiol-3-on-5-yl)-(methyl)sulphide | 118 |
| 2 | (4-chloro-1,2-dithiol-3-on-5-yl)-(ethyl)sulphide | 104 |
| 3 | (4-chloro-1,2-dithiol-3-on-5-yl)-(n-propyl)-sulphide | 60 |
| 4 | (4-chloro-1,2-dithiol-3-on-5-yl)-(acetylmethyl)-sulphide | 99 |
| 5 | (4-chloro-1,2-dithiol-3-on-5-yl)-(benzoylmethyl)-sulphide | 142 |
| 6 | (4-chloro-1,2-dithiol-3-on-5-yl)-(carboxymethyl)-sulphide | 205 |
| 7 | (4-chloro-1,2-dithiol-3-on-5-yl)-(diethylaminoethyl)-sulphide | 33 |
| 8 | (4-chloro-1,2-dithiol-3-on-5-yl)-(diethylaminoethyl)-sulphide, hydrochloride | 153 |
| 9 | (4-chloro-1,2-dithiol-3-on-5-yl)-(diethylaminoethyl)-sulphide, fluoroborate | 147 |
| 10 | (4-chloro-1,2-dithiol-3-on-5-yl)-(isopropoxycarbonyl-methyl)-sulphide | 78 |
| 11 | (4-chloro-1,2-dithiol-3-on-5-yl)-(J-methoxyethoxycarbonyl-methyl)-sulphide | 49 |
| 12 | (4-chloro-1,2-dithiol-3-on-5-yl)-(n-dodecyloxycarbonyl-methyl)-sulphide | 61 |
| 13 | (4-chloro-1,2-dithiol-3-on-5-yl)-(carbamoylmethyl)-sulphide | 174 |
| 14 | (4-chloro-1,2-dithiol-3-on-5-yl)-(dimethylcarbamoyl-methyl)-sulphide | 161 |
| 15 | (4-chloro-1,2-dithiol-3-on-5-yl)-(2',4'-dimethylphenyl)-sulphide | 112 |
| 16 | (4-chloro-1,2-dithiol-3-on-5-yl)-(phenyl)-sulphide | 154 |
| 17 | (4-chloro-1,2-dithiol-3-on-5-yl)-(4'-methylphenyl)-sulphide | 117 |
| 18 | (4-chloro-1,2-dithiol-3-on-5-yl)-(2',5'-dichlorophenyl)-sulphide | 120 |
| 19 | (4-chloro-1,2-dithiol-3-on-5-yl)-(pentachlorophenyl)-sulphide | 151 |
| 20 | (4-chloro-1,2-dithiol-3-on-5-yl)-(4'-nitrophenyl)-sulphide | 149 |
| 21 | (4-chloro-1,2-dithiol-3-on-5-yl)-(2'-isopropylphenyl)-sulphide | 113 |
| 22 | (4-chloro-1,2-dithiol-3-on-5-yl)-(benzyl)-sulphide | 98 |
| 23 | (4-chloro-1,2-dithiol-3-on-5-yl)-(2'-chlorobenzyl)-sulphide | 96 |
| 24 | (4-chloro-1,2-dithiol-3-on-5-yl)-(4'-nitrobenzyl)-sulphide | 122 |
| 25 | (4-chloro-1,2-dithiol-3-on-5-yl)-(3'-chlorobenzyl)-sulphide | 121 |
| 26 | (4-chloro-1,2-dithiol-3-on-5-yl)-(4'-bromobenzyl)-sulphide | 108 |
| 27 | (4-chloro-1,2-dithiol-3-on-5-yl)-(4'-methylbenzyl)-sulphide | 108 |
| 28 | (4-chloro-1,2-dithiol-3-on-5-yl)-(2',4'-dimethylbenzyl)-sulphide | 117 |
| 29 | (4-chloro-1,2-dithiol-3-on-5-yl)-[(1'-phenyl)ethyl]-sulphide | 76 |
| 30 | (4-chloro-1,2-dithiol-3-on-5-yl)-[(1'-naphthyl)-methyl]-sulphide | 178 |
| 31 | (4-chloro-1,2-dithiol-3-on-5-yl)-(2'-thenyl)-sulphide | 92 |
| 32 | (4-chloro-1,2-dithiol-3-on-5-yl)-[(2'-methylisothiazol-4'-yl)-methyl]-sulphide | 166 |
| 33 | (4-chloro-1,2-dithiol-3-on-5-yl)-[(2'-pyridyl)-methyl]-sulphide | 82 |
| 34 | (4-chloro-1,2-dithiol-3-on-5-yl)-[N-oxidopyridyl-(2')]-sulphide | 154 |
| 35 | (4-chloro-1,2-dithiol-3-on-5-yl)-(5',6'-dihydro-4',4',6'-trimethyl-4'H-1',3'-thiazin-2'-yl)-sulphide | 118 |
| 36 | (4-chloro-1,2-dithiol-3-on-5-yl)-(4',6'-dimethoxy-1',3',5'-triazin-2'-yl)-sulphide | 177 |

TABLE I.—Continued

| No. | Compound | Melting Point. in ° C |
|---|---|---|
| 37 | (4-chloro-1,2-dithiol-3-on-5-yl)-(Δ2'-oxazolin-2'-yl)-sulphide | [1] 165 |
| 38 | (4-chloro-1,2-dithiol-3-on-5-yl)-(benzoxazol-2'-yl)-sulphide | 136 |
| 39 | (4-chloro-1,2-dithiol-3-on-5-yl)-(Δ-1'-imidazolin-2'-yl)-sulphide hydrochloride. | [1] 167-175 |
| 40 | (4-chloro-1,2-dithiol-3-on-5-yl)-(1'-methylimidazol-2'-yl)-sulphide | 140 |
| 41 | (4-chloro-1,2-dithiol-3-on-5-yl)-(benzimidazol-2'-yl)-sulphide | 159 |
| 42 | (4-chloro-1,2-dithiol-3-on-5-yl)-(Δ2'-thiazolin-2'-yl)-sulphide | 153 |
| 43 | (4-chloro-1,2-dithiol-3-on-5-yl)-(thiazol-2'-yl)-sulphide | 117 |
| 44 | (4-chloro-1,2-dithiol-3-on-5-yl)-(4'-methylthiazol-2'-yl)-sulphide | 133 |
| 45 | (4-chloro-1,2-dithiol-3-on-5-yl)-(4'-carboxymethyl-thiazol-2'-yl)-sulphide. | 150 |
| 46 | (4-chloro-1,2-dithiol-3-on-5-yl)-[4'-(ethoxycarbonyl)-methyl-thiazol-2'-yl]-sulphide. | 69 |
| 47 | (4-chloro-1,2-dithiol-3-on-5-yl)-(4'-phenylthiazol-2'-yl)-sulphide | 122 |
| 48 | (4-chloro-1,2-dithiol-3-on-5-yl)-(benzthiazol-2'-yl)-sulphide | 152 |
| 49 | (4-chloro-1,2-dithiol-3-on-5-yl)-(2'-thiono-3'H-1',3',4'-thiadiazolin-5'-yl)-sulphide. | 172 |
| 50 | (4-chloro-1,2-dithiol-3-on-5-yl)-(2'-imino-3'H-1',3',4'-thiadiazolin-5'-yl)-sulphide. | [1] 190-200 |
| 51 | (4-chloro-1,2-dithiol-3-on-5-yl)-(2'-thiono-3'-phenyl-1',3',4'-thiadiazolin-5'-yl)-sulphide. | 132 |
| 52 | (4-chloro-1,2-dithiol-3-on-5-yl)-[adamant-(1')-yl]-sulphide | 70-71 |
| 53 | (4-chloro-1,2-dithiol-3-on-5-yl)-(cyclohexyloxy-carbonyl-methyl)-sulphide. | 57-58 |
| 54 | (4-chloro-1,2-dithiol-3-on-5-yl)-(2'-methyl-1',3',4'-oxadiazol-5'-yl)-sulphide. | 149.5-150 |
| 55 | 4-chloro-5-acetylthio-1,2-dithiol-3-one | 118 |
| 56 | (4-chloro-1,2-dithiol-3-on-5-yl)-[(morpholino)-thiocarbonyl]-sulphide | 192 |
| 57 | (4-chloro-1,2-dithiol-3-on-5-yl)-[(dimethylamino)-thiocarbonyl]-sulphide. | 161 |
| 58 | (4-chloro-1,2-dithiol-3-on-5-yl)-[(diethylamino)-thiocarbonyl]-sulphide. | 114 |
| 59 | (4-chloro-1,2-dithiol-3-on-5-yl)-(isopropyl)-sulphide | 54-55 |

[1] Decomposition.

EXAMPLE 13

A solution of 71.0 parts of sodium thiosulphate in 50 parts by volume of water is added dropwise within 6 minutes to a solution of 93.5 parts of 4,5-dichloro-1,2-dithiol-3-one in 350 parts by volume of ethylene glycol monomethyl ether. During the addition the mixture is stirred vigorously and kept at 0–5° by intensive cooling. The reaction product crystallises out. On completion of the dropwise addition, the whole is stirred for another 15 minutes at 30°, then cooled to 15° and the crystallisate is filtered off. It is boiled with 200 parts by volume of ethylene glycol monomethyl ether, cooled to —5° and again filtered. Non-reacted 4,5-dichloro-1,2-dithiol-3-one is removed in this way. The filter residue is bis-(4-chloro-1,2-dithiol-3-on-5-yl)-sulphide which melts at 112°. The yield is 53.5 parts (63.8% of the theoretical).

EXAMPLE 14

A mixture of 37.4 parts of 4,5-dichloro-1,2-dithiol-3-one, 18.8 parts of thioacetamide, 25.2 parts of magnesium carbonate and 150 parts by volume of methanol is stirred for 30 hours at 20° and then treated with a mixture of 300 parts by volume of methylene chloride and 50 parts by volume of water. After filtration, the methylene chloride layer is removed, extracted with 50 parts by volume of water, dried, treated with charcoal and kieselguhr and concentrated. The evaporation residue is dissolved in 150 parts by volume of boiling trichloroethylene and 80 parts by volume of cyclohexane are added to the solution. 8.7 parts (26% of the theoretical) of pure bis-(4-chloro-1,2-dithiol-3-on-5-yl)-sulphide crystallise out; M.P. 112°.

EXAMPLE 15

19 parts by volume of an about 40% solution of peracetic acid in aqueous acetic acid are added to a suspension of 25.7 parts of (4-chloro-1,2-dithiol-3-on-5-yl)-([methoxycarbonyl]-methyl)-sulphide in 140 parts by volume of acetic acid, the addition being made within 15 minutes while stirring at an inner temperature of 45–48°. It is then left to stand for an hour whereupon the reaction product partly crystallises out. The greater part of the solvent is then distilled off under reduced pressure and the product is filtered off. It is washed with a little methanol and recrystallised from benzene. 17.9 parts (66% of the theoretical) of (4-chloro-1,2-dithiol-3-on-5-yl)-[(methoxycarbonyl) - methyl] - sulphoxide are obtained; M.P. 123°.

EXAMPLE 16

2.1 parts of 80% m-chloro-perbenzoic acid are added to a solution of 2.1 parts of (4-chloro-1,2-dithiol-3-on-5-yl)-(ethyl)-sulphide in 30 parts by volume of benzene, the addition being made within 15 minutes while stirring. During the addition, the temperature is kept at 22–25° by cooling. The whole is then stirred for another 30 minutes at 22° and afterwards filtered. The filtrate is shaken with 20 parts by volume of sodium bicarbonate solution. The organic phase is then separated, dried and evaporated. The evaporation residue is recrystallised twice from methanol. 1.7 parts (75% of the theoretical) of (4-chloro-1,2-dithiol-3-on-5-yl)-(ethyl)-sulphoxide, M.P. 94°, are obtained.

EXAMPLE 17

5 parts by volume of 45% peracetic acid in glacial acetic acid are added dropwise to the solution of 7.1 parts of (4 - chloro - 1,2-dithiol-3-on-5-yl)-(2'-chlorobenzyl)-sulphide in 30 parts by volume of methylene chloride, the addition being made within 1 hour at an inner temperature of 5–10° while stirring. The whole is then stirred for 2 hours while cooling with ice. The methylene chloride is distilled off and the oil which remains is dissolved in 15 parts by volume of methanol, whereupon 6.8 parts (91% of the theoretical) of pure (4-chloro-1,2-dithiol-3-on-5-yl)-(2' - chlorobenzyl) - sulphoxide, M.P. 135–136°, crystallise out.

The sulphoxides of 1,2-dithiol-3-ones given in the following Table II are produced by oxidation of corresponding sulphides according to the processes described in Examples 15 to 17.

TABLE II

| No. | Compound | Melting Point in ° C. |
|---|---|---|
| 1 | (4-chloro-1,2-dithiol-3-on-5-yl)-(methyl)-sulphoxide | 178 |
| 2 | (4-chloro-1,2-dithiol-3-on-5-yl)-(n-propyl)-sulphoxide | 118 |
| 3 | (4-chloro-1,2-dithiol-3-on-5-yl)-(ethoxycarbonyl-methyl)-sulphoxide | 96 |
| 4 | (4-chloro-1,2-dithiol-3-on-5-yl)-(isopropoxy-carbonyl-methyl)-sulphoxide. | 84 |
| 5 | (4-chloro-1,2-dithiol-3-on-5-yl)-(n-dodecyloxycarbonyl-methyl)-sulphoxide. | 61 |
| 6 | (4-chloro-1,2-dithiol-3-on-5-yl)-(2'-chloroethyl)-sulphoxide | ¹ 161 |
| 7 | (4-chloro-1,2-dithiol-3-on-5-yl)-(2'-acetoxyethyl)-sulphoxide | 124 |
| 8 | (4-chloro-1,2-dithiol-3-on-5-yl)-(carbamoylmethyl)-sulphoxide | 175 |
| 9 | (4-chloro-1,2-dithiol-3-on-5-yl)-([dimethylcarbamoyl]-methyl]-sulphoxide. | ¹ 173 |
| 10 | (4-chloro-1,2-dithiol-3-on-5-yl)-(benzylmethyl)-sulphoxide | 156 |
| 11 | (4-chloro-1,2-dithiol-3-on-5-yl)-(phenyl)-sulphoxide | 124 |
| 12 | (4-chloro-1,2-dithiol-3-on-5-yl)-(4'-methylphenyl)-sulphoxide | 177 |
| 13 | (4-chloro-1,2-dithiol-3-on-5-yl)-(2'-isopropyl-phenyl)-sulphoxide | 105 |
| 14 | (4-chloro-1,2-dithiol-3-on-5-yl)-(-4'-nitrophenyl)-sulphoxide | ¹ 222 |
| 15 | (4-chloro-1,2-dithiol-3-on-5-yl)-(2',4'-dimethylphenyl)-sulphoxide | 125 |
| 16 | (4-chloro-1,2-dithiol-3-on-5-yl)-(benzyl)-sulphoxide | 155 |
| 17 | (4-chloro-1,2-dithiol-3-on-5-yl)-(4'-nitrobenzyl)-sulphoxide | 179 |
| 18 | (4-chloro-1,2-dithiol-3-on-5-yl)-(2',4'-dimethyl-benzyl)-sulphoxide | 145 |
| 19 | (4-chloro-1,2-dithiol-3-on-5-yl)-[(1'-naphthyl)-methyl]-sulphoxide | 159 |
| 20 | (4-chloro-1,2-dithiol-3-on-5-yl)-(4'-bromobenzyl)-sulphoxide | 177 |
| 21 | (4-chlroo-1,2-dithiol-3-on-5-yl)-(4'-methylbenzyl)-sulphoxide | 170 |
| 22 | (4-chloro-1,2-dithiol-3-on-5-yl)-(3,-chlorobenzyl)-sulphoxide | 160 |
| 23 | (4-chloro-1,2-dithiol-3-on-5-yl)-[(2'-phenyl)-ethyl]-sulphoxide | 102 |
| 24 | (4-chloro-1,2-dithiol-3-on-5-yl)-(2'-pyridyl)-sulphoxide | ¹ 159 |
| 25 | (4-chloro-1,2-dithiol-3-on-5-yl)-(4'-phenylthiazol-2'-yl)-sulphoxide | ¹ 208 |
| 26 | (4-chloro-1,2-dithiol-3-on-5-yl)-(thienyl)-sulphoxide | 125 |
| 27 | (4-chloro-1,2-dithiol-3-on-5-yl)-[(2'-methylthiazol-4'-yl)-methyl]-sulphoxide. | 176 |
| 28 | (4-chloro-1,2-dithiol-3-on-5-yl)-[2'-(trichlor-acetoxy)-ethyl]-sulphoxide | 112 |
| 29 | (4-chloro-1,2-dithiol-3-on-5-yl)-[2'-(methanesulphonyloxy)-ethyl]-sulphoxide. | 146 |
| 30 | (4-chloro-1,2-dithiol-3-on-5-yl)-(isopropyl)-sulphoxide | 196–197 |
| 31 | (4-chloro-1,2-dithiol-3-on-5-yl)-[adamant-(1')-yl]-sulphoxide | 143 |
| 32 | (4-phenyl-1,2-dithiol-3-on-5-yl)-(methyl)-sulphoxide | |
| 33 | (4-phenyl-1,2-dithiol-3-on-5-yl)-(ethyl)-sulphoxide | |

¹ Decomposition.

EXAMPLE 18

3.2 parts of methyl iodide and 2.0 parts of sodium bicarbonate are added at room temperature to the solution of 6.0 parts of (4-chloro-1,2-dithiol-3-on-5-yl)-(2'-thiono-3'H-1',3',4'-thiadiazolin-5'-yl)-sulphide in 20 parts by volume of dimethyl formamide and the mixture is stirred until, after about 15 minutes, it has solidified into a thick slurry. 50 parts by volume of water are added, it is filtered, the filter residue is washed first with 20 parts by volume of ethanol and then with 100 parts by volume of water and is recrystallised from 15 parts by volume of dimethyl formamide. 5.3 parts (84% of the theoretical) of pure (4-chloro-1,2-dithiol-3-on-5-yl)-(2' - methylthio - 1',3',4'-thiadiazol-5'-yl)-sulphide are obtained which melts at 124–125°.

The compounds mentioned in the following Table III are produced by the process described in Example 18.

TABLE III

| No. | Compound | Melting Point in ° C. |
|---|---|---|
| 1 | (4-chloro-1,2-dithiol-3-on-5-yl)-(2'-ethylthio-1',3',4'-thiadiazol-5'-yl)-sulphide. | 87 |
| 2 | (4-chloro-1,2-dithiol-3-on-5-yl)-[2'-β,γ,γ-trichlorallyl)-thio-1',3',4'-thiadiazol-5'-yl]-sulphide. | 129 |
| 3 | (4-chloro-1,2-dithiol-3-on-5-yl)-(2'-benzylthio-1',3',4'-thiadiazol-5'-yl)-sulphide. | 132 |

EXAMPLE 19

60 parts by volume of thionyl chloride are poured over 22.9 parts of (4 - chloro - 1,2 - dithiol - 3 - on - 5 - yl)-(2'-hydroxyethyl)-sulphide. First, with strong gas development, a clear solution is formed from which a precipitate begins to separate out. After completion of the gas development, the whole is heated for 1 hour at 95–100°. It is then filtered and the filtrate is evaporated. The evaporation residue crystallises on stirring with ice water; the crude yield is 22.5 parts (91% of the theoretical). Recrystallisation from ethanol yields 19.0 parts (77% of the theoretical) of pure (4-chloro-1,2-dithiol-3-on-5-yl)-2'-chloroethyl)-sulphide, M.P. 64–64.5°.

EXAMPLE 20

A mixture of 22.9 parts of (4-chloro-1,2-dithiol-3-on-5-yl)-(2'-hydroxyethyl)-sulphide, 37 parts of trichloracetic acid anhydride, 100 parts by volume of dichloromethane and 0.2 parts by volume of 96% sulphuric acid is refluxed for 1 hour. All volatile components are then distilled off at 80°/15 torr. The oily residue crystallises after two days. Recrystallisation from ether yields 26.2 parts (81% of the theoretical) of pure (4-chloro-1,2-dithiol-3-on-5-yl)-[(2'-trichloracetoxy)-ethyl]-sulphide, M.P. 63°.

EXAMPLE 21

A suspension of 9 parts of (4-chloro-1,2-dithiol-3-on-5-yl) - (2' - imino-3'H-1',3',4'-thiadiazolin-5'-yl)-sulphide in 100 ml. of acetanhydride is refluxed for 1 hour. After cooling, the reaction product is filtered off and recrystallised from ethylene glycol monomethyl ether. 5 parts (50% of the theoretical) of (4-chloro 1,2-dithiol-3-on-5 - yl) - (2'-acetylamino-1',3',4'-thiadiazol-5'-yl)-sulphide are obtained. It decomposes at 225–227°.

EXAMPLE 22

6 parts of phosphorus oxychloride are added dropwise within 10 minutes to 20 parts by volume of dimethyl formamide, the addition being made while cooling with ice. A solution of 4.4 parts of (4-chloro-1,2-dithiol-3-on-5 - yl) - (2'-imino-3'H-1',3',4'-thiadiazolin-5'-yl)-sulphide in 20 parts of dimethyl formamide is added to the solution obtained. The reaction product which crystallises out is filtered off and washed, first with a slight amount of dimethyl formamide, then with sodium bicarbonate solution and finally with water. The crude product is recrystallised from ethylene glycol monomethyl ether. 3.0 parts (54% of the theoretical) of (4-chloro-1,2-dithiol- 3 - on - 5 - yl)-[2'-(dimethylaminoformylimino)-1',3',4'-thiadiazol-5'-yl]-sulphide, M.P. 170–171° are obtained.

EXAMPLE 23

11.6 parts of triethylamine are added dropwise to a mixture of 22.9 parts of (4-chloro-1,2-dithiol-3-on-5-yl)-(2'-hydroxyethyl)-sulphide, 13.1 parts of methane sulphochloride and 200 parts by volume of dichloromethane, the addition being made within about 5 minutes at —20° while stirring. Stirring is continued for another 10 minutes without cooling and then the precipitated triethylamine hydrochloride is filtered off. The filtrate is washed twice with water and dried with magnesium sulphate. After distilling off the dichloromethane, an oil remains. This is dissolved in 50 parts by volume of ethylene glycol monomethyl ether; the solution is seeded and cooled to 0°. The product slowly crystallises out. It is filtered off, washed with methanol and dried in the air. 25.0 parts (82% of the theoretical) of 4-chloro-1,2-dithiol-3-on-5-yl)-[2'-(methane sulphonyloxy)-ethyl]-sulphide are obtained, M.P. 86°. A sample recrystallised from isopropanol melts at 89°.

EXAMPLE 24

A mixture of 28.4 parts of (4-chloro-1,2-dithiol-3-on-5-yl)-(2'-diethylaminoethyl)-sulphide, 15.0 parts of allyl bromide and 15 parts by volume of acetone is refluxed for 1 hour. After cooling, the crystalline reaction product is filtered off, washed with a little acetone and dried. 37.3 parts (92% of the theoretical) of diethyl-allyl-2-(4'-chloro - 1',2' - dithiol-3'-on-5'-yl-thio)-ethyl-ammonium-bromide are thus obtained; M.P. 183° (with decomposition).

In addition, the following compounds are produced by the process described:

TABLE IV

| No. | Compound | Melting Point in ° C. |
|---|---|---|
| 1 | Diethyl-methyl-2-(4'-chloro-1',2'-dithiol-3'-on-5'-ylthio)-ethyl-ammonium iodide. | 175 |
| 2 | Diethyl-n-hexyl-2-(4'-chloro-1',2'-dithiol-3'-on-5'-ylthio)-ethyl-ammonium iodide. | 179 |
| 3 | Diethyl-n-dodecyl-2-(4'-chloro-1',2'-dithiol-3'-on-5'-ylthio)-ethyl-ammonium iodide. | 94 |
| 4 | Diethyl-benzyl-2-(4'-chloro-1',2'-dithiol-3'-on-5'-ylthio)-ethyl-ammonium bromide. | 172 |

EXAMPLE 25

48.2 parts of dimethyl sulphate are added dropwise to a suspension of 110 parts of the dimethyl ammonium salt of 4-phenyl-5-mercapto-1,2-dithiol-3-thione in 500 parts of methanol, the addition being made within 35 minutes while stirring at an inner temperature of 10–15°. (The above mercapto compound is produced by reacting α-methylstyrene with sulphur in the presence of dimethyl formamide, cf. British Pat. No. 1,049,637.) The whole is then stirred for 2 hours at 15–20° inner temperature, then cooled to —30° and filtered. The filter residue is recrystallised from ethylene glycol monomethyl ether. 74.4 parts of 4-phenyl-5-methylthio-1,2-dithiol-3-thione, M.P. 125–126° are obtained.

The solutions of 20 parts of 4-phenyl-5-methylthio-1,2-dithiol-3-thione in 150 parts of chloroform and of 50 parts of mercury-(II)-acetate in 1000 parts of glacial acetic acid are combined. The mixture is left to stand for 3 days at 20–23° after which it is filtered. The filtrate is shaken three times with 500 parts of water each time, dried over magnesium sulphate and concentrated. The residue is dissolved in boiling ethylene glycol monomethyl ether. On cooling, 14 parts (75% of the theoretical) of 4 - phenyl - 5 - methyl-thio-1,2-dithiol-3-one crystallise into needles which melt at 103–105°.

On using 90 parts of diethyl sulphate instead of the dimethyl sulphate mentioned above, and with otherwise the same procedure, 73 parts of 4-phenyl-5-ethylthio-1,2-dithiol-3-thione, M,P. 91–92°, are obtained, from which 4-phenyl-5-ethylthio-1,2-dithiol-3-one, M.P. 76–77°, is produced.

EXAMPLE 26

A solution of 16 parts of potassium permanganate in acetone is added dropwise to a stirred and ice-cooled suspension of 24 parts of 4-phenyl-5-methylthio-1,2-dithiol-3-thione in 100 parts of acetone and the whole is then filtered. The filtrate is concentrated, the residue is dissolved in chloroform, again filtered and the filtrate is put into a chromatography column filled with silica gel. On eluting with a mixture of chloroform/hexane, an eluate consisting of pure 4-phenyl-5-methylthio-1,2-dithiol-3-one is obtained which melts at 103–105°.

EXAMPLE 27

37.4 parts of 4,5-dichloro-1,2-dithiol-3-one and 40 parts of benzene sulphinic acid sodium salt in 300 parts by volume of methanol are heated within 30 minutes to 60° while stirring. Part of the product crystallises out during this time. To complete the reaction, the reaction mixture is set aside for 2 hours at room temperature, after which 400 parts of warm water (70°) are added. The reaction product is filtered off, washed with water and then dried. The yield of crude product is 56.8 parts=97% of the theoretical. After recrystallisation from ethanol, the 4-chloro-5-phenylsulphonyl-1,2-dithiol - 3 - one obtained melts of 121°.

EXAMPLE 28

A mixture of 9.3 parts of 4,5-dichloro-1,2-dithiol-3-one, 15 parts of 4-toluene sulphinic acid sodium salt and 50 parts by volume of water is brought within 2 hours from 50° to 95° while stirring. During the heating, the reaction product crystallises. The reaction mixture is then filtered while still warm. The filter residue is washed with water and then dried. The yield of crude product is 14.1 parts=92% of the theoretical. Recrystallised from ethanol, the 4-chloro-5-(4'-tolylsulphonyl)-1,2-dithiol-3-one obtained melts at 132°.

EXAMPLE 29

28 parts of 4,5-dichloro-1,2-dithiol-3-one and 43 parts of β-naphthalene sulphinic acid sodium salt in 50 parts by volume of benzene and 100 parts of water are heated, while stirring, for 4 hours at 50–55° and then boiled for 3 hours. The reaction mixture is cooled to 0° and the precipitate formed is filtered off. The filter residue is washed with water and then dried. The yield of crude product is 45 parts=87% of the theoretical. Recrystallised from isopropanol, the 4 - chloro-5-(β-naphthylsulphonyl-1,2-dithiol-3-one melts at 132°.

EXAMPLE 30

4.65 parts of 4,5-dichloro-1,2-dithiol-3-one and 4 parts of β-phenylethane sulphinic acid sodium salt in 20 parts by volume of ethanol are boiled for 20 minutes while stirring. Water is then added to the reaction mixture and the reaction product which precipitates is filtered off. The filter residue is washed with water and then dried. The yield is 7.6 parts=95% of the theoretical. The 4-chloro-5-(β-phenylethylsulphonyl)-1,2-dithiol - 3 - one melts at 137°.

EXAMPLE 31

3 parts of 4-(4'-tolyl)-5-chloro-1,2-dithiol-3-one and 2.1 parts of crude thiophene sulphinic acid sodium salt in 12 parts by volume of dimethyl sulphoxide are stirred at room temperature for 30 minutes and then 50 parts of ice water are added. The reaction product precipitates. To purify, it is boiled with 20 parts by volume of ethanol, whereupon it only partly dissolves, is again cooled and filtered. The yield of crude product is 3.3 parts=76% of the theoretical. On recrystallisation from benzene/cyclohexane, the 4-(4'-tolyl)-5-(thienyl-[2'']-sulfonyl - 1,2-dithiol-3-one melts at 132°.

EXAMPLE 32

First, 4 parts of methane sulphinic acid sodium salt and then 5.8 parts of 4-phenyl-5-chloro-1,2-dithiol-3-one are added to 30 parts of dimethyl formamide while stirring, the mixture being cooled with ice water. The reaction mixture is then stirred for 60 minutes at room temperature whereupon 150 parts of ice water are added. After a short time, the reaction product crystallises out. After filtering off, it is washed with water and recrystallised from ethanol. Recrystallised from ethanol, the 4-phenyl-5-methylsulphonyl-1,2-dithiol - 3 - one melts at 153°. The yield of crude substance is 4 parts=58% of the theoretical.

EXAMPLE 33

7.0 parts of 4,5-dichloro-1,2-dithiol-3-one and 10 parts of 4-acetamidobenzene sulphinic acid sodium salt are boiled for 45 minutes while stirring in 100 parts by volume of methanol. The reaction mixture is then cooled and the precipitate formed is filtered off. The filter residue is washed, first with 50 parts by volume of hot methanol, then with 50 parts by volume of a mixture of methanol and water 1:1 and finally with water, and dried. Recrystalled from ethylene glycol monomethyl ether (methyl Cellosolve), the 4 - chloro-5-(4'-acetamidophenylsulphonyl-1,2-dithiol-3-one obtained melts at 234–236°. In order to saponify the acetamido group, 50 parts by volume of methyl Cellosolve and 20 parts by volume of concentrated aqueous hydrobromic acid can be added to this substance. The mixture is kept for 2½ hours at 70–75° while shaking now and then. A clear solution is obtained which is evaporated to dryness. Ice water is added to the residue and it is neutralised with a little sodium bicarbonate. The product which precipitates is filtered off under suction, washed several times with water and dried. The yield of crude product is 7.3 parts=63% of the theoretical (calculated on the 4,5-dichloro-1,2-dithiol-3-one used). The 4-chloro-5-(4'-amino-phenylsulphonyl) - 1,2 - dithiol-3-one obtained in this way melts at 191–193° after recrystallisation from ethanol/water.

EXAMPLE 34

A mixture of 1.5 parts by volume of 40% aqueous peracetic acid and 15 parts by volume of glacial acetic acid are added dropwise within 1 hour to a solution of 1.18 parts of 4-chloro-5(4'-chlorophenylthio)-1,2-dithiol-3-one in 80 parts by volume of glacial acetic acid, the addition being made while stirring at room temperature. The whole is then heated for 15 hours at 67–70°. The glacial acetic acid is then distilled off and the residue is recrystallised from ethylene glycol monomethyl ether. The melting point of the product obtained is 190° (not clear). Chromatographic adsorption on silica gel in chloroform yields pure 4 - chloro-5-(4'-chlorophenylsulphonyl)-1,2-dithiol-3-one from it. The pure product melts at 192°.

EXAMPLE 35

1300 parts by volume of an about 40% solution of peracetic acid in acetic acid are added within 30 hours to a suspension of 638 parts of (4-chloro-1,2-dithiol-3-one-5-yl)-ethyl-sulphide in 2000 parts by volume of glacial acetic acid, the addition being made while stirring at an internal temperature of 30–35°. The whole is then stirred for a further 20 hours at room temperature and afterwards cooled at 10°. The crystalline reaction product is filtered off, washed several times with methanol and finally dried in the air. The yield is 550 parts (75% of the theoretical). The 4-chloro-5-ethylsulfonyl-1-2-dithiol-3-one obtained in this way melts at 122°.

The following compounds may be obtained in the manner described in Examples 1–8 and 125.

EXAMPLE 36

4 - chloro - 5-(2'-chlorobenzylsulphonyl)-1,2-dithiol-3-one.

EXAMPLE 37

4 - chloro - 5-(4'-chlorobenzylsulphonyl)-1,2-dithiol-3-one.

EXAMPLE 38

4 - chloro - 5-(4'-bromobenzylsulphonyl)-1,2-dithiol-3-one.

EXAMPLE 39

4 - chloro - 5-(4'-methylbenzylsulphonyl)-1,2-dithiol-3-one.

EXAMPLE 40

4 - chloro - 5 - [naphth-(1')-ylmethylsulphonyl]-1,2-dithiol-3-one.

EXAMPLE 41

4 - (4' - chlorophenyl)-5-methylsulphonyl-1,2-dithiol-3-one.

EXAMPLE 42

4 - (4'-tert.butylphenyl)-5-methylsulphonyl-1,2-dithiol-3-one.

EXAMPLE 43

4-chloro-5-carboxymethylsulphonyl-1,2-dithiol-3-one.

EXAMPLE 44

4 - chloro - 5-(methoxycarbonyl-methylsulphonyl)-1,2-dithiol-3-one.

EXAMPLE 45

4 - chloro - 5-(2'-methoxy-ethylsulfonyl)-1,2-dithiol-3-one.

EXAMPLE 46

4 - chloro - 5-(2'-acetamido-ethylsulphonyl)-1,2-dithiol-3-one.

EXAMPLE 47

4 - chloro - 5 - (2'-diethylamino-ethysulphonyl)-1,2-dithiol-3-one.

EXAMPLE 48

4 - chloro - 5-(2'-p-tolyl-ethylsulphonyl)-1,2-dithiol-3-one.

EXAMPLE 49

4 - chloro - 5-(2'-p-chlorophenyl-ethylsulphonyl)-1,2-dithiol-3-one.

EXAMPLE 50

4 - chloro-5-(2'-hydroxy-5'-nitrophenylsulphonyl)-1,2-dithiol-3-one.

EXAMPLE 51

4 - chloro - 5-(2'-cyanophenylsulphonyl)-1,2-dithiol-3-one.

EXAMPLE 52

4 - chloro - 5 - [2'-bromonaphthyl-(1')-sulfonyl]1,2-dithiol-3-one.

EXAMPLE 53

4 - chloro - 5 - (3' - methyl-4'-ethoxycarbonylphenylsulphonyl)-1,2-dithiol-3-one.

EXAMPLE 54

4 - chloro - 5-(4'-n-nonylphenylsulphonyl)-1,2-dithiol-3-one.

EXAMPLE 55

4 - chloro - 5-(4′-phenoxyphenylsulphonyl)-1,2,-dithiol-3-one.

EXAMPLE 56

4-chloro-5-biphenylsulphonyl-1,2-dithiol-3-one.

EXAMPLE 57

4 - chloro - 5-(4′ethylthiophenylsulfonyl)-1,2-dithiol-3-one.

EXAMPLE 58

4 - chloro - 5-(4′dimethylaminophenylsuphonyl)-1,2-dithiol-3-one.

EXAMPLE 59

4-chloro-5-n-hexysulphonyl-1,2-dithiol-3-one.

| 4-chloro-1,2-dithiol-3-one substituted in 5-position by: | Effect |
|---|---|
| Ethylthio | 9 |
| Methoxycarbonylthio | 10 |
| 4′-chlorophenylthio | 10 |
| Isopropoxy-carbonylmethylthio | 9 |
| 4′,6′-dimethoxy-1′,3′,4′-triazinyl-(2′)-thio | 7 |
| Δ¹′imidazolinyl-(2′)-thio (hydrochloride) | 10 |
| 2′-ethylthio-1′,3′,4′-thiadiazolyl-(5′)-thio | 8 |
| 2′ - imino-3′-H-1′,3′,4′-thiadiazolinyl - (5′)-thio | 7 |
| (Piperidino)-thiocarbonylthio | 8 |
| Ethylsulfinyl | 7 |
| Methylsulfinyl | 9 |
| Ethoxycarbonylmethylsulfinyl | 10 |

| Example No. | Name | M.P., °C. |
|---|---|---|
| 60 | 4-chloro-5-methylsulfonyl-1,2-dithiol-3-one | 196 |
| 61 | 4-chloro-5-ethylsulfonyl-1,2-dithiol-3-one | 122 |
| 62 | 4-chloro-5-n-propylsulfonyl-1,2-dithiol-3-one | 77 |
| 63 | 4-chloro-5-isopropylsulfonyl-1,2-dithiol-3-one | 126 |
| 64 | 4-chloro-5-n-butylsulfonyl-1,2-dithiol-3-one | 69 |
| 65 | 4-chloro-5-chloromethylsulfonyl-1,2-dithiol-3-one | 136 |
| 66 | 4-chloro-5-(2′-tolylsulfonyl)-1,2-dithiol-3-one | 107 |
| 67 | 4-chloro-5-(2′,5′-dimethylphenylsulfonyl)-1,2-dithiol-3-one | 129 |
| 68 | 4-chloro-5-(2′,4′-dimethylphenylsulfonyl)-1,2-dithiol-3-one | 92 |
| 69 | 4-chloro-5-(4′-chlorophenylsulfonyl)-1,2-dithiol-3-one | 192 |
| 70 | 4-chloro-5-(2′,5′-dichlorophenylsulfonyl)-1,2-dithiol-3-one | 164 |
| 71 | 4-chloro-5-(2′,4′,5′-trichlorophenylsulfonyl)-1,2-dithiol-3-one | 180 |
| 72 | 4-chloro-5-(2′,4′-dichloro-5′-methylphenylsulfonyl)-1,2-dithiol-3-one | 182 |
| 73 | 4-chloro-5-(3′-carboxyphenylsulfonyl)-1,2-dithiol-3-one | 255 |
| 74 | 4-chloro-5-(4′-methoxyphenylsulfonyl)-1,2-dithiol-3-one | 162 |
| 75 | 4-chloro-5-[5′,6′,7′,8′-tetrahydronaphthyl-(2′)-sulfinyl]-1,2-dithiol-3-one | 148 |
| 76 | 4-chloro-5-[thienyl-(2′)-sulfonyl]-1,2-dithiol-3-one | 134 |
| 77 | 4-phenyl-5-phenylsulfonyl-1,2-dithiol-3-one | 117 |
| 78 | 4-phenyl-5-(4′-tolylsulfonyl)-1,2-dithiol-3-one | 133 |
| 79 | 4-(4′-tolyl)-5-methylsulfonyl-1,2-dithiol-3-one | 188 |
| 80 | 4-(4′-tolyl)-5-phenylsulfonyl-1,2-dithiol-3-one | 141 |
| 81 | 4-chloro-5-(4′-isopropylphenylsulfonyl)-1,2-dithiol-3-one | 125 |
| 82 | 4-chloro-5-(2′,4′,6′-trimethylphenylsulfonyl)-1,2-dithiol-3-one | 145 |
| 83 | 4-chloro-5-(4′-ethylphenylsulfonyl)-1,2-dithiol-3-one | 90 |
| 84 | 4-chloro-5-(3′,4′-dimethylphenylsulfonyl)-1,2-dithiol-3-one | 147 |
| 85 | 4-chloro-5-(4′-sec.butylphenylsulfonyl)-1,2-dithiol-3-one | 62 |
| 86 | 4-chloro-5-benzylsulfonyl-1,2-dithiol-3-one | 139 |
| 87 | 4-phenyl-5-ethylsulfonyl-1,2-dithiol-3-one | 113 |

The phytofungicidal activity of compounds of Formula I was determined by comparative tests on beans.

Leaves of bean plants (*Phaseolus vulgaris*) in the two-leaf stage were sprayed with an aqueous suspension containing 0.1% of active substance.

The suspension was obtained from a 10% wettable powder by dilution with water. After drying, the leaves were infested with a fresh suspension of spores of Uromyces appendiculatus, left for one day in a moist room and then kept in a greenhouse. The test was evaluated after 7 to 10 days, according to the following comparative scale:

10=full activity (no infestation).
9–1=decreasing activity.
0=inactive, like the control plants.
X=leaves damaged (burned place or zone).
XX=up to ⅓ of the leaf surface damaged.
XXX=more than ⅓ of the leaf surface damaged or leaf and plant respectively destroyed.

| Compound: | Results |
|---|---|
| 4-chloro-5-methylsulfonyl-1,2-dithiol-3-one | 10 |
| 4-chloro-5-ethylsulfonyl-1,2-dithiol-3-one | 9 |
| 4-chloro-5-n-butylsulfonyl-1,2-dithiol-3-one | 8 |
| 4-chloro-5-chlormethylsulfonyl - 1,2 - dithiol - 3 - one | 10 |
| 4-chloro-5-phenylsulfonyl-1,2-dithiol-3-one | 10 |
| 4-chloro-5 - (2′,4′ - dimethylphenylsulfonyl)-1,2-dithiol-3-one | 9 |
| 4-chloro-5-(2′-phenylethylsulfonyl)-1,2 - dithiol-3-one | 9 |
| 4-chloro-5-thienylsulfonyl-1,2-dithiol-3-one | 8 |
| 4-phenyl-5-methylsulfonyl-1,2-dithiol-3-one | 8 |
| 4-phenyl-5-(4′-tolylsulfonyl)-1,2-dithiol-3-one | 8 |
| 4-(4′-tolyl)-5-methylsulfonyl-1,2-dithiol-3-one | 8 |
| Benzylsulfinyl | 8 |
| 2′chlorobenzylsulfinyl | 9 |
| 4-phenyl-5-chloro (German Patent Application 1,126,668) | XX |
| 4-p-tolyl-5-chloro (German Patent Application 1,126,668) | XXX |
| 4,5-dichloro (German Patent Application 1,-102,174) | 0 |

The action on bacteria and fungi was determined with cotton treated with compounds according to the invention of Formula I, by:

(I). Bacteriostatic and fungistatic inhibition test
(II). Earth burial test
(III). Mildew spot test The active substance is dissolved in methyl Cellosolve in such a way that there are 25 g. of active substance per litre solvent. Boiled cotton fabric (about 85 g./sq. m.) is dipped into this solution and squeezed out between rollers to 40% moisture content. The content of active substance on the fabric is then 1%. The strips of fabric are hung up for 5 minutes in a stream of steam and then dried. The strips are then washed for 2×15 minutes with 5 g. of soap per litre, the washing being performed at 40° C., then rinsed twice for 3 minutes each time and dried. The following tests serve to evaluate the effectiveness of this treatment:

(I). Bacteriostatic inhibition test

The action on bacteria was ascertained by means of the following bacteriostatic test on the following strains of bacteria: Staphylococcus aureus SG 511, Escherichia coli NCTC 8196, Bacillus pumilus.

"The Agar incorporation test" according to Leonard and Blackford was used as test method. Nutrient agar plates containing 100, 30, 10 and 3 p.p.m. of active substance (p.p.m. means parts of active substance per 10⁶ parts of diluent) are inoculated with solutions of the above strains and incubated 2×24 hours at 37°. The marginal concentrations inhibiting the growth of individual strains are given in the following Table VI:

above, and is expressed in percent of the original mechanical strength.

TABLE VII

| No. | Compound | Mechanical strength at end of the test in percent |
|---|---|---|
| 1 | (4-chloro-1,2-dithiol-3-on-5-yl)-(4'-methylthiazol-2'-yl)-sulphide | 100 |
| 2 | (4-chloro-1,2-dithiol-3-on-5-yl)-(benzoxazol-2'-yl)-sulphide | 100 |
| 3 | (4-chloro-1,2-dithiol-3-on-5-yl)-(2'-thiazolin-2'-yl)-sulphide | 100 |
| 4 | (4-chloro-1,2-dithiol-3-on-5-yl)-(5'-imino-4'H-1',3',4'-thiadiazolin-2'-yl)-sulphide. | 100 |
| 5 | (4-chloro-1,2-dithiol-3-on-5-yl)-[(piperidino)-thiocarbonyl]-sulphide. | 100 |
| 6 | (4-chloro-1,2-dithiol-3-on-5-yl)-(2'-pyridyl)-sulphide | 100 |
| 7 | 4,5-dichloro-1,2-dithiol-3-on (German specification open to public inspection No. 1,102,174). | 0 |
| 8 | 4-phenyl-5-chloro-1,2-dithiol-3-one (German specification open to public inspection No. 1,126,668). | 0 |

TABLE VI

| Number | Compound | Staph. aureus, SG 511 | E. coli, NCTC, 8196 | Bac. pumilus |
|---|---|---|---|---|
| 1 | (4-chloro-1,2-dithiol-3-on-5-yl)-(methyl)-sulphoxide | 10 | 10 | 10 |
| 2 | (4-chloro-1,2-dithiol-3-on-5-yl)-(ethyl)-sulphoxide | 10 | 10 | 10 |
| 3 | (4-chloro-1,2-dithiol-3-on-5-yl)-(n-propyl)-sulphoxide | 10 | 30 | 10 |
| 4 | (4-chloro-1,2-dithiol-3-on-5-yl)-(2'-chlorethyl)-sulphide | 10 | 30 | 10 |
| 5 | (4-chloro-1,2-dithiol-3-on-5-yl)-(benzyl)-sulphoxide | 1 | 30 | 3 |
| 6 | (4-chloro-1,2-dithiol-3-on-5-yl)-[(methoxycarbonyl)-methyl]-sulphoxide | 10 | 10 | 10 |
| 7 | (4-chloro-1,2-dithiol-2-on-5-yl)-(2'-imino-3'H1',-3',4'-thiadiazolin-5'-yl)-sulphide | 3 | 10 | 10 |
| 8 | (4-chloro-1,2-dithiol-3-on-5-yl)-(thiazol-2'-yl)-sulphide | 3 | 10 | 3 |
| 9 | (4-chloro-1,2-dithiol-3-on-5-yl)-(2'-pyridyl)-sulphoxide | 10 | 100 | 10 |
| 10 | (4-chloro-1,2-dithiol-3-on-5-yl)-(2'-acetoxyethyl)-sulphoxide | 10 | 100 | 10 |
| 11 | 4-phenyl-5-chloro-1,2-dithiol-3-one (compound known from German publication open to public inspection No. 1,126,668). | 100 | 100 | 100 |

Earth burial test

Circular samples of 40 mm. diameter are cut from the sample materials treated by the application method described above and these are buried in compost earth consisting of 50% by weight of cow dung, 30% by weight of compost and 20% by weight of sand. The earth has 30% relative humidity and is kept at 29° C. After 10 days, the samples were removed from the earth, cleaned, conditioned at 20° C. and 65% relative humidity and its mechanical strength is tested in the bursting strength machine (R. Burgess: J. of Applied Bacteriology 17, 230, 1954). The mechanical strength after the earth burial test is compared with that of the original material, which was determined before it had been treated as described The fungicidal activity of the new compounds of general Formula XI was further determined by the so-called spore germination test on the following types of fungi:

Alternaria tenuis
Botrytis cinerea
Clasterosporium c.
Conithyrium dipl.
Fusarium culmorum
Mucor spec.
Penicillium spec.
Stemphylium cons.

1 cc. of a 1%, 0.1% and 0.01% acetone solution of the active substance is placed on each of 2 glass slides (26 x 76 mm.), under the same conditions. The solvent is evaporated off and a uniform coating of active substance is obtained on the glass slides. The slides are inoculated with spores of the above fungi and then kept in dishes at room temperature in an atmosphere which is almost saturated with steam. The germinated spores are counted twice, first after 2–3 days and the second time after 4–6 days. The average is formed from the two values obtained. The results are summarised in the following table.

TABLE

| Compound: | A | B | C | D | E | F | G | H |
|---|---|---|---|---|---|---|---|---|
| 4-chloro-5-methylsulphonyl-1,2-dithiol-3-one | ++ | ++ | ++ | ++ | ++ | ++ | ++ | ++ |
| 4-chloro-5-ethylsulfonyl-1,2-dithiol-3-one | ++ | ++ | ++ | ++ | ++ | ++ | ++ | ++ |
| 4-chloro-5-n-propylsulfonyl-1,2-dithiol-3-one | ++ | ++ | ++ | ++ | ++ | ++ | ++ | ++ |
| 4-chloro-5 isopropylsulfonyl-1,2-dithiol-3-one | ++ | ++ | ++ | ++ | ++ | + | ++ | ++ |
| 4-chloro-5-(β-phenylethylsulfonyl)-1,2-dithiol-3-one | ++ | ++ | ++ | ++ | ++ | ++ | ++ | ++ |
| 4-chloro-5-phenylsulfonyl-1,2-dithiol-3-one | ++ | ++ | ++ | ++ | ++ | ++ | ++ | ++ |
| 4-chloro-5-(2'-tolylsulfonyl)-1,2-dithiol-3-one | +++ | +++ | +++ | +++ | +++ | +++ | +++ | +++ |
| 4-chloro-5-(4'-tolylsulfonyl)-1,2-dithiol-3-one | ++ | ++ | ++ | ++ | ++ | ++ | ++ | ++ |
| 4-chloro-5-(4'-sec. butylphenylsulfonyl)-1,2-dithiol-3-one | +++ | + | +++ | +++ | ++ | +++ | +++ | +++ |
| 4-chloro-5-(2',5'-dimethylphenylsulfonyl)-1,2-dithiol-3-one | ++ | ++ | ++ | ++ | ++ | ++ | ++ | ++ |
| 4-chloro-5-(2',4'-dimethylphenylsulfonyl)-1,2-dithiol-3-one | ++ | ++ | ++ | ++ | ++ | ++ | ++ | ++ |
| 4-chloro-5-(4'-aminophenylsulfonyl)-1,2-dithiol-3-one | ++ | ++ | ++ | ++ | ++ | ++ | ++ | ++ |
| 4-chloro-5-benzylsulfonyl-1,2-dithiol-3-one | +++ | +++ | +++ | +++ | ++ | − | +++ | +++ |
| 4-chloro-5-(β-naphthylsulfonyl)-1,2-dithiol-3-one | ++ | ++ | ++ | ++ | ++ | ++ | ++ | ++ |
| 4-phenyl-5-methylsulfonyl-1,2-dithiol-3-one | ++ | ++ | +++ | +++ | ++ | ++ | ++ | +++ |
| 4-phenyl-5-ethylsulfonyl-1,2-dithiol-3-one | ++ | ++ | +++ | +++ | ++ | ++ | ++ | +++ |
| 4-chloro-1,2-dithiol-3-one substituted in 5-position by: | | | | | | | | |
| 2'-(trichloroacetoxy)-ethyl-thio | +++ | + | +++ | +++ | ++ | + | + | +++ |
| Acetylmethylthio | + | + | + | + | + | + | + | + |
| 2'-(methanesulfonyloxy)-ethylthio | +++ | +++ | +++ | +++ | +++ | +++ | +++ | +++ |
| 2'-(N,N-diethylamine)-ethylthio | +++ | +++ | +++ | +++ | + | ++ | +++ | +++ |

See footnote at end of table.

TABLE—Continued

| | A | B | C | D | E | F | G | H |
|---|---|---|---|---|---|---|---|---|
| (Methoxycarbonyl)-methylthio | +++ | + | +++ | +++ | +++ | + | +++ | +++ |
| Dimethylcarbamoyl-methylthio | + | + | + | + | + | + | + | + |
| Benzoylmethylthio | +++ | ++ | +++ | +++ | +++ | + | +++ | ++ |
| Carboxymethylthio | +++ | +++ | +++ | +++ | +++ | ++ | +++ | +++ |
| Thiazolyl-(2')-thio | +++ | +++ | +++ | +++ | +++ | ++ | +++ | +++ |
| (4'-chloro-1',2'-dithiol-3'-on-5'yl)-thio | +++ | ++ | +++ | +++ | +++ | ++ | +++ | +++ |
| Δ²'-thiazolinyl-(2')-thio | ++ | ++ | +++ | +++ | +++ | ++ | ++ | +++ |
| Thenylthio | +++ | +++ | +++ | +++ | − | + | +++ | +++ |
| (4'-chlorothenyl)-thio | + | + | + | + | + | + | + | + |
| (Pyridyl-[2'])-methylthio | +++ | +++ | +++ | +++ | +++ | +++ | +++ | +++ |
| (Diethylamino-thiocarbonyl)-thio | ++ | + | +++ | +++ | − | + | − | ++ |
| (Ethoxythiocarbonyl)-thio | +++ | +++ | +++ | +++ | ++ | + | +++ | +++ |
| Methylsulfinyl | ++ | ++ | ++ | ++ | ++ | ++ | ++ | ++ |
| Ethylsulfinyl | +++ | +++ | +++ | +++ | +++ | +++ | +++ | +++ |
| n-Propylsulfinyl | +++ | +++ | +++ | +++ | +++ | +++ | +++ | +++ |
| 2'-chloro-ethyl-sulfinyl | +++ | +++ | +++ | +++ | +++ | +++ | +++ | +++ |
| 2'-(methanesulfonyloxy)-ethylsulfinyl | +++ | ++ | +++ | +++ | +++ | ++ | ++ | ++ |
| Benzoylmethyl-sulfinyl | +++ | ++ | +++ | +++ | +++ | + | +++ | +++ |
| 2'-(trichloroacetoxy)-ethyl-sulfinyl | ++ | ++ | ++ | ++ | ++ | + | +++ | +++ |
| Isopropoxycarbonyl-methylsulfinyl | ++ | + | +++ | +++ | + | + | +++ | +++ |
| N,N-dimethylcarbamoylmethylsulfinyl | + | + | + | + | + | + | + | + |
| 4'-chloro-benzylsulfinyl | +++ | ++ | +++ | +++ | +++ | + | +++ | +++ |
| (4'-methyl-)benzylsulfinyl | +++ | +++ | +++ | +++ | +++ | − | +++ | +++ |
| 3'-chloro-benzylsulfinyl | +++ | +++ | +++ | +++ | +++ | + | +++ | +++ |
| 4'-nitro-benzylsulfinyl | +++ | + | +++ | +++ | +++ | + | +++ | +++ |
| Naphthyl-(1')-methylsulfinyl | +++ | +++ | +++ | +++ | + | + | +++ | +++ |
| 4'-tolylsulfinyl | +++ | + | +++ | +++ | + | − | + | +++ |
| 2'-isopropyl-phenylsulfinyl | +++ | +++ | +++ | +++ | +++ | +++ | +++ | +++ |
| 2'-methylthiazolyl-(4')-methylsulfinyl | ++ | ++ | +++ | +++ | ++ | + | +++ | +++ |
| Compounds: | | | | | | | | |
| 4-phenyl-5-[N-oxido-pyridyl-(2')thio]-1,2-dithiol-3-one | ++ | − | ++ | ++ | ++ | − | ++ | ++ |
| 4,5-dichloro-1,2-dithiol-3-one (German patent appl. 1,102,174) | − | − | − | − | − | − | − | − |

NOTE:
+ means an at least 90% inhibition of germination effected by the residue of 1 cc. of a 1% solution of active substance.
++ means the same inhibition effected by the residue of 1 cc. of a 0.1% solution of the active substance.
+++ means the same inhibition effected by the residue of 1 cc.m. of a 0.01% solution of active substance.
− means no inhibition of germination with the concentrations used.

The following micro organisms were used:

A=*Alternaria tenuis.*
B=*Botrytis cinerea.*
C=*Clasterosporium c.*
D=*Coniothyrium dipl.*
E=*Fusarium culm.*
F=*Mucor spec.*
G=*Penicillium spec.*
H=*Stemphylium cons.*

To lend an effective, broad and protracted protection against fungi to, for example, a paint based on dispersion colours, the procedure can be as follows:

3 parts of active substance are dissolved in 5 parts of a 1:1 mixture of dimethyl formamide and ethylene glycol monomethyl ether. 87 parts (or 92 parts or 92.7 parts) of a commercial dispersion colour having a foundation of polyvinyl acetate-ethyl acrylate copolymer are stirred into this solution, 5 parts of water are added and the whole is stirred until homogeneity is attained. Two other paints are produced by the same method using 1 or 0.3 part of active substance and 89 or 89.7 parts respectively of dispersing colour. The 3%, 1% or 0.3% finished colours so obtained are painted on filter paper, e.g., Whatman 3 mm., (320 g. per sq. m.) to test the fungistatic activity; the papers are aired for 8 days at 65° and a relative humidity of 80–90%.

Circular samples of 2 cm. diameter are cut from this filter paper and placed in Petri dishes each containing 20 cc. of Sabouraud-Maltose agar inoculated with Pullularia pullulans. The following Table IX shows the concentration with which there was no growth of fungi either on the upper or lower side of the sample or on the surface of the agar under the sample.

| Compound: | Minimum effective concentration (in percent) |
|---|---|
| 4 - chloro - 5 - n - butylsulfonyl - 1,2-dithiol-3 - one | 1 |
| 4-chloro - 5 - chloromethylsulfonyl - 1,2 - dithiol - 3 - one | 0.3 |
| 4 - chloro - 5 - (2',5'-dichlorophenylsulfonyl)-1,2 - dithiol - 3 - one | 0.3 |
| 4 - chloro - 5 - (2' - tolylsulfonyl) - 1,2-dithiol - 3 - one | 1 |
| 4-chloro - 5 - (2',5'-dimethylphenylsulfonyl)-1,2 - dithiol - 3 - one | 1 |
| 4 - chloro - 5 - (2',5' - dimethylsulfonyl)-1,2-dithiol - 3 - one | 1 |
| 4 - chloro - 5 - (3' - carboxyphenylsulfonyl)-1,2 - dithiol - 3 - one | 1 |
| 4 - chloro - 5 - (4' - aminophenylsulfonyl)-1,2 - dithiol - 3 - one | 1 |
| 4-phenyl - 5 - methylsulfonyl - 1,2 - dithiol-3 - one | ≦0.3 |
| 4 - (4' - tolyl) - 5 - methylsulfonyl-1,2-dithiol - 3 - one | ≦0.3 |
| 4,5-dichloro - 1,2 - dithiol - 3 - one (German Patent Application 1,126,668) | >3 |
| 4 - phenyl - 5 - chloro - 1,2 - dithiol - 3 - one (German Patent Application 1,102,174) | >3 |

| 4-chloro-1,2-dithiol-3-one substituted in 5-position by: | Effective minimum concentration (in percent) |
|---|---|
| Benzoxazolyl - (2') thio | ≦0.3 |
| Benzimidazolyl - (2') - thio | ≦0.3 |
| 4'-methylthiazol - 2' - yl-thio | ≦0.3 |
| Ethylthio | ≦0.3 |
| Methylthio | ≦0.3 |
| Methoxycarbonyl - methyl - thio | ≦0.3 |
| 4' - chloro - 1',2' - dithiol - 3' - onyl - (5')-thio | ≦0.3 |
| N-oxido-pyridyl - (2') - thio | ≦0.3 |
| Benzyl - thio | ≦0.3 |
| 5'-amino - 1',3',4' - thiadiazolyl-(2')-thio | ≦0.3 |
| 5' - methylthio - 1',3',4' - thiadiazolyl - (2')-thio | ≦0.3 |
| Ethylsulfinyl | 1 |
| Methyl-sulfinyl | ≦0.3 |
| 2' - chloroethyl - thio | ≦0.3 |

Compounds:

| | |
|---|---|
| 5-[thiazolyl - (2') - thio] - 4 - chloro - 1,2-dithiol - 3 - one | ≦0.3 |
| 5 - phenylsulfinyl - 4 - chloro - 1,2 - dithiol-3 - one | ≦0.3 |
| 5 - (2' - chlorobenzyl - sulfinyl) - 4 - chloro-1,2 - dithiol - 3 - one | |
| 5 - (isopropoxycarbonylmethyl - sulfinyl) - 4-chloro - 1,2 - dithiol - 3 - one | 1 |
| 5 - (ethoxycarbonylmethyl - sulfinyl) - 4-chloro - 1,2 - dithiol - 3 - one | ≦0.3 |

The bactericidal and fungicidal action of 1,2-dithiol-3-ones according to the invention were further tested by dissolving 25 g. of the active substance to be tested in 1 liter of ethylene glycol monomethyl ether. Strips of cotton fabric which had been washed at the boil (about 85 g./l. sq. m.) were dipped in this solution and then squeezed out to a liquor content of 40% by weight, calculated on the dry weight of the fabric, so that the concentration of active substance on the fabric was 1% by weight. The strips of fabric were dried for 5 minutes in a stream of steam after which they were washed twice for 15 minutes each time with a soap solution (5 g. soap/liter of water) at 40° C., then rinsed twice for 3 minutes each time with cold water and dried. The following tests were then made with the strips of fabric so treated.

(a) Inhibition test

Circular samples of 2 cm. diameter of said fabric were placed in Petri dishes on agar culture-medium which had been inoculated in the usual way with (A) *Staphylococcus aureaus* SG 511
(B) *Escherichia coli* NCTC 8196
(C) *Aspergillus niger* ATCC
(D) *Candida albicans*

The dishes containing strains (A), (B) and (D) were stored for 24 hours at 37° and (C) for 3 days at 28°. The effectiveness of the active substances were determined by counting the number of germs and colonies of germ either on or under the sample.

In the following table the symbols signify:
+=growth of bacteria and fungi on and under the fabric sample.
−=no growth.
A *Staphylococcus aureus* SG 511.
B *Escherichia coli* NCTC 8196.
C *Aspergillus niger* ATCC.
D *Candida albicans*.

| Compound | A | B | C | D |
|---|---|---|---|---|
| 4-chloro-5-methylsulfonyl-1,2-diethiol-3-one | − | − | − | − |
| 4-chloro-5-n-butylsulfonyl-1,2-diethiol-3-one | − | − | − | − |
| 4-chloro-5-(2'-tolylsulfonyl)-1,2-dithiol-3-one | − | − | − | − |
| 4-chloro-5-(4'-aminophenylsulfonyl)-1,2-dithiol-3-one | − | − | − | − |
| 4-chloro-5-(3'-carboxyphenylsulfonyl)-1,2-dithiol-3-one | − | − | − | − |
| 4-chloro-5-(2',4'-dichlorophenylsulfonyl)-1,2-dithiol-3-one | − | − | − | − |
| 4-chloro-5-[thienyl-(2')-sulfonyl]-1,2-dithiol-3-one | − | − | − | − |
| 4-phenyl-[5-methylsulfonyl]-1,2-dithiol-3-one | − | − | − | − |
| 4-chloro-5-(4'-methyl)thiazolyl-[2']-1,2-dithiol-3-one | − | − | − | − |

(b) Maceration test

Circular samples of 4 cm. diameter of the fabric treated as described above were subjected to maceration in compost consisting of 50% cow dung, 30% compost and 20% sand (all percent by weight). The soil had 30% relative humidity and was kept at 28° C. After 10 days, the samples were disinterred, cleaned and conditioned at 20 to 24° C. and 65% relative humidity. The tensile strength after the maceration, measured by the resistance to perforation is compared with that of the fabric before the treatment above described, the initial tensile strength having been previously determined. It is expressed in percentage of said initial tensile strength.

| Compound: | Residual tensile strength in percent |
|---|---|
| 4-chloro-5-methylsulfonyl-1,2-dithiol-3-one | 100 |
| 4-chloro-5-ethylsulfonyl-1,2-dithiol-3-one | 97 |
| 4-chloro-5-(4'-sec.butylphenylsulfonyl)-1,2-dithiol-3-one | 100 |
| 4-chloro-5'-(2',4--dimethylphenylsulfonyl)-1,2-dithiol-3-one | 100 |
| 4-chloro-5-(2',4',6'-trimethylphenylsulfonyl)-1,2-dithiol-3-one | 100 |
| 4-chloro-5-(2',5'-dichlorophenylsulfonyl)-1,2-dithiol-3-one | 100 |
| 4-chloro-5-benzylsulfonyl-1,2-dithiol-3-one | 100 |
| 4-chloro-5-(β-phenyl-ethylsulfonyl)-1,2-dithiol-3-one | 100 |
| 4-chloro-5-(β-naphthylsulfonyl)-1,2-dithiol-3-one | 100 |
| (4-chloro-1,2-dithiol-3-on-5-yl)-(4'-methylthiazol-2'-yl)-sulfide | 100 |
| (4-chloro-1,2-dithiol-3-on-5-yl)-(benzoxazol-2'-yl)-sulfide | 100 |
| (4-chloro-1,2-dithiol-3-on-5-yl)-(2'-thazolin-2'-yl)-sulfide | 100 |
| (4-chloro-1,2-dithiol-3-on-5-yl)(5'-imino-4'H-1',3',4'-thiadiazolin-2'-yl)-sulfide | 100 |
| (4-chloro-1,2-dithiol-3-on-5-yl)-[(piperidino)-thiocarbonyl]-sulfide | 100 |
| (4-chloro-1,2-dithiol-3-on-5-yl)-(2'-pyridyl)-sulfide | 100 |

(c) Mildew spot test

Circular samples of 8 cm. diameter of the fabric treated as described above were placed on sterile Worth agar plates prepared according to Difco Manual, 9th edition p. 244 by spreading 15 ml. of Worth agar in Petri dishes of 10 cm. diameter and leaving them to solidify.

The samples were placed on the agar which was then inoculated with a spore suspension containing a mixture of the spores of the fungi *Chaetomium globosum*, *Aspergillus niger* and *Trichoderma viride*.

The Petri dishes were stored for 5 days at 28° C. and then the growth of mould was determined.

Results

In following table the symbols signify:

0=no growth of mildew spots and mould.
+=few mildew spots and little mould growth.
++=medium degree of mildew spots and mould growth.
+++=many mildew spots and strong mould growth.

| Compound | Result |
|---|---|
| 4-chloro-5-methylsulfonyl-1,2-dithiol-3-one | 0 |
| 4-chloro-5-ethylsulfonyl-1,2-dithiol-3-one | 0 |
| 4-chloro-5-(2'-tolylsulfonyl)-1,2-dithiol-3-one | 0 |
| 4-chloro-5-(4'-tolylsulfonyl)-2-dithiol-3-one | 0 |
| 4-chloro-5-(2',4'-dimethylsulfonyl)-1,2-dithiol-3-one | 0 |
| 4-chloro-5-(4'-ethylphenylsulfonyl)-,2-dithiol-3-one | 0 |
| 4-chloro-5-(4'-sec.butylphenylsulfonyl)-,2-dithiol-3-one | 0 |
| 4-chlor-5-(2',5'-dichlorophenylsulfonyl)-,2-dithiol-3-one | 0 |
| 4-chloro-5-(3'-carboxyphenylsulfonyl)-1,2-dithiol-3-one | 0 |
| 4-chloro-5-(β-phenylethylsulfonyl)-1,2-dithiol-3-one | 0 |
| 4-chloro-5-benzylsulfonyl-1,2-dithiol-3-one | 0 |
| 4-phenyl-5-methylsulfonyl-1,2-dithiol-3-one | 0 |
| (4-chloro-1,2-dithiol-3-on-5-yl)-(Δ²'-thiazolin-2'-yl) sulfide | + |
| bis-(4-chloro-1,2-dithiol-3-on-5-yl) sulfide | 0 |
| (4-chloro-1,2-dithiol-3-on-5-yl)-(Δ²'-imidazolin-2'-yl) sulfide | + |
| (4-chloro-1,2-dithiol-3-on-5-yl)-(2'-chlorobenzyl) sulfoxide | 0 |
| 4,5-dichloro-1,2-dithiol-3-one(German Patent | +++ |
| 4-phenyl-5-chloro-1,2-dithiol-3-one (German Patent Application 1,126,668) | +++ |

The action on bacteria was further ascertained by means of the following bacteriostatic test on the following strains of bacteria: *Staphylococcus aureus* SG 511, *Escherichia coli*, NCTC 8196, *Bacillus pumilus*.

The agar incorporation test according to Leonard and Blackford was used as test method. Nutrient agar plates containing 100, 30, 10 and 3 p.p.m. of active substance (p.p.m. means parts of active substance per $10^6$ part of diluent) are inoculated with solutions of the above strains and incubated 2× 24 hours at 37°. The marginal concentrations inhibiting the growth of the individual strains are given in the following table:

| Compound: | Staph. aureus, SG 511 | E. coli, NCTC 8196 | Bacillus pumilus |
|---|---|---|---|
| 4-chloro-5-isopropylsulfonyl-1,2-dithiol-3-one | 3 | 30 | 3 |
| 4-chloro-5-n-butylsulfonyl-1,2-dithiol-3-one | 10 | 30 | 10 |
| 4-phenyl-5-methylsulfonyl-1,2-dithiol-3-one | 3 | 30 | 10 |
| 4-chloro-5-ethylsulfonyl-1,2-dithiol-3-one | 10 | 30 | 10 |
| 4-chloro-5-n-propylsulfonyl-1,2-dithiol-3-one | 10 | 30 | 10 |
| 4-chloro-5-(4'-aminophenylsulfonyl)-1,2-dithiol-3-one | 10 | 30 | 10 |
| 4-phenyl-5-chloro-1,2-dithiol-3-one (German patent application No. 1,126,668) | 100 | 100 | 100 |
| 4-chloro-1,2-dithiol-3-one substituted in 5-position by: | | | |
| Methylsulfinyl | 10 | 10 | 10 |
| Ethylsulfinyl | 10 | 10 | 10 |
| n-Propylsulfinyl | 10 | 30 | 10 |
| 2'-chloroethylsulfinyl | 10 | 30 | 10 |
| Benzylsulfinyl | 1 | 30 | 3 |
| Methoxy-carbonylmethyl-sulfinyl | 10 | 10 | 10 |
| 2'-imino-3'H-1',3',4'-thiadiazolinyl-(5')-thio | 3 | 10 | 10 |
| 4-chloro-1,2-dithiol-3-one-5-ylthio | 3 | 10 | 3 |
| Pyridyl-(2')-sulfinyl | 10 | 100 | 10 |
| 2'-(acetoxy)-ethylthio | 10 | 100 | 10 |

The fungicidal and bactericidal agents according to the invention are produced in the known way by intimately mixing and milling active ingredients of Formula I with suitable carriers, optionally with the addition of dispersing agents or solvents which are inert to the active substances. These agents can be made up into and used in the following forms:

Solid forms: dust, scattering agents, granulates such as coated granules, impregnated granules, homogeneous granules;
Water dispersible concentrates of active substances: wettable powders, pastes, emulsions,
Liquid forms: solutions and aerosols.

To produce the solid forms for use (dusts, scattering agents, granulates), the active substances are mixed with solid carriers. Examples of carriers are kaolin, talcum, bole, loess, chalk, limestone, ground limestone, ataclay, dolomite, diatomaceous earth, precipitated silica, alkaline earth metal silicates, sodium and potassium aluminum silicates (feldspar and mica), calcium and magnesium sulfates, magnesium oxide, milled synthetic plastics, fertilisers such as ammonium sulfate, ammonium phosphates, ammonium nitrate, urea, ground vegetable products such as bran, bark dust, sawdust, ground nutshells, cellulose powder, residues of plant extractions, active charcoal, etc. These carriers can be used alone or admixed with each other.

The particle size of the carriers is for dusts up to about $100\mu$, for scattering agents from about $75\mu$–0.2 mm., and for granulates from 0.2–1 mm. or coarser.

As a rule, the concentration of active substances in the solid preparations is from about 0.5–80%.

To these mixtures can also be added additives which stabilize the active substance and/or nonionogenic, anionically and cationically active substances which, for example, improve the adhesion of the active substances on plants and parts of plants (glues and adhesives) and/or attain better wettability (wetting agents) and dispersibility (dispersing agents) of the active substances. Examples of adhesives are as follows: olein/chalk mixtures, cellulose derivatives (methyl celluloses, carboxymethyl celluloses), hydroxyethyl glycol ethers of mono- and dialkyl phenols having 5–15 ethylene oxide radicals per molecule and 8–9 carbon atoms in the alkyl radical, lignin sulfonic acids, alkaline and alkaline earth metal salts thereof, polyethylene glycol ethers (Carbowaxes), fatty alcohol polyethylene glycol ethers having 5 to 20 ethylene oxide radicals per molecule and 8–18 carbon atoms in the fatty alcohol moiety, condensation products of ethylene oxide/propylene oxide, polyvinyl pyrrolidones, polyvinyl alcohols, condensation products of urea/formaldehyde as well as Latex products.

The concentrates of active substance which can be dispersed in water (wettable powders), pastes, and emulsion concentrates are agents which can be diluted with water to any concentration desired. They consist of active substance, carrier, optionally additives which stabilize the active substance, surface active substances, and anti-foam agents and, optionally, solvents. The concentration of active substance in these agents is 5–80%.

Wettable powders and pastes are obtained by mixing and milling the active substances with dispersing agents and pulverulent carriers in suitable mixers and milling machines until homogeneity is attained. Carriers are, for example, those mentioned in the paragraph dealing with solid forms for application. In some cases it is advantageous to use mixtures of different carriers. Examples of dispersing agents which can be used are: condensation products of sulfonated naphthalene and sulfonated naphthalene derivatives and formaldehyde, condensation products of naphthalene or naphthalene sulfonic acids with phenol and formaldehyde as well as alkali, ammonium and alkaline earth metal salts or lignin sulfonic acid, further alkylaryl sulfonates, alkali and alkaline earth metal salts of dibutyl naphthalene sulfonic acid, fatty alcohol sulfates such as salts of sulfated hexadecanols, heptadecanols, octadecanols, octadecenols and salts of sulfated fatty alcohol polyglycol ethers, the sodium salt of oleoyl ethionate, the sodium salt of oleoyl methyl tauride, diteriary acetylene glycols, dialkyl dilauryl ammonium chloride and fatty acid alkali and alkaline earth metal salts.

Silicones, "Antifoam A," etc. are examples of antifoamin agents.

The active substances are so mixed, milled, sieved and strained with the additives mentioned above that, in wettable powders, the solid particle size of 20–40$\mu$ and, in pastes, of 3$\mu$, is not exceeded. To produce emulsion concentrates and pastes, dispersing agents such as those given in the previous paragraphs, organic solvents and water are used. Examples of solvents are as follows: alcohols, benzene, xylenes, toluene, dimethyl sulfoxide and mineral oil fractions boiling between 120 and 350°. The solvents must be almost without smell, not phytotoxic, inert to the active substances, and not easily inflammable.

In addition, the agents according to the invention can be applied in the form of solutions. For this purpose the active substance or several active substances of Formula I are dissolved in suitable organic solvents, mixtures of solvents or in water. Aliphatic and aromatic hydrocarbons, chlorinated derivatives thereof, alkyl naphthalenes alone or mixed with each other can be used as organic solvents. The solutions contain the active substances in a concentration from 1 to 20%.

The agents described according to the invention can be mixed with other biocidally active compounds or agents. Thus, to broaden the range of action, the new agents can contain, e.g., insecticides, other fungicides, bactericides, fungistatics, bacteriostatics or nematocides in addition to the compounds mentioned of Formula I. The agents according to the invention can also contain fertilizers, trace elements, etc.

The following forms for application of the agents according to the invention serve to illustrate the applicative aspect of the present invention; where not otherwise expressly stated, parts and percentages are given by weight.

Dusts

The following components are used to produce (a) a 10% and (b) a 2% dust:

(a) 10 parts of (4-chloro-1,2-dithiol-3-on-5-yl)-(benzyl)-sulphoxide,
5 parts of highly dispersed silicic acid, and
85 parts of talcum.

(b) 2 parts of (4-chloro-1,2-dithiol-3-on-5-yl)-(methoxycarbonylmethyl)-sulphide,
1 part of highly dispersed silica (e.g., Aerosil), and
97 parts of talcum.

To produce (c) a 10% and (d) a 2% dust, the following components are used:

(c) 10 parts of 4-chloro-5-phenylsulfonyl-1,2-dithiol-3-one,
5 parts of highly dispersed silica, and
85 parts of talcum.

(d) 2 parts of 4-chloro-5-(2',5'-dimethylphenylsulphonyl)-1,2-dithiol-3-one,
1 part of highly dispersed silica, and
97 parts of talcum.

The above active substances are intimately mixed and milled with the carriers. The fungicidal dusts so obtained serve for the treatment of seed beds or for the dusting of plants.

Seed dressings

To produce (a) a 10% and (b) a 60% seed dressing, the following are used:

(a) 10 parts of 4-chloro-5-methylsulfonyl-1,2-dithiol-3-one,
5 parts of kieselguhr,
1 part of liquid paraffin,
84 parts of talcum.

(b) 60 parts of 4-phenyl-5-methylsulfonyl-1,2-dithiol-3-one,
15 parts of kieselguhr,
1 part of liquid paraffin,
24 parts of talcum.

The active substances mentioned are intimately mixed in a mixer with the carriers given and the pariffin as distributing agent and then milled. The pulverulent seed dressings obtained serve for the treatment of seeds of all types.

Seed dressings of similar satisfactory properties are obtained by replacing the active substances named in the compositions described under (a) and (b), supra, by the following active substances, respectively:

(a') 5 - (morpholino) - thiocarbonyl - thio - 4 - chloro - 1,2-dithiol-3-one, (b') 5-ethyl-sulfinyl-4-chloro-1,2-dithiol-3-one.

Granulates

To produce (a) a 2.5% and (b) a 5% granulate, the following components are used:

(a) 2.5 parts of 4-phenyl-5-methylsulfonyl-1,2-dithiol-3-one,
2.5 parts of kieselguhr,
5 parts of polyethylene glycol,
89.3 parts of ground limestone (0.4–0.8 mm. diameter),
0.7 part of silica.

(b) 5 parts of 4-chloro-5-n-butylsulfonyl-1,2-dithiol-3-one,
1.5 parts of kieselguhr,
0.5 part of cetyl polyglycol ether,
87 parts of ground limestone,
5 parts of polyethylene glycol,
1 part of silica.

The ground limestone in each formulation is impregnated with the polyethylene glycol or with the cetyl polyglycol ether and then mixed with a mixture consisting of the active substance given, the silica and the kieselguhr. These granulates are particularly suitable for the disinfection of seed beds.

Granulates of similar satisfactory properties are obtained by replacing the active substances used in the compositions described under (a) and (b), supra, by the following active substances, respectively:

(a') 5 - [2' - imino-3'H-1',3',4'-thiadiazolinyl-(5')-thio]-4-chloro-1,2-dithiol-3-one, (b') 5-methyl-sulfinyl-4-chloro-1,2-dithiol-3-one.

Wettable powders

To produce a 10% wettable powder, the following components are used:

10 parts of 4-chloro-5-chloromethylsulfonyl-1,2-dithiol-3-one,
10 parts of sodium lignin sulfate,
2 parts of a finely milled mixture of kaolin and polyvinyl alcohol (1:1),
10 parts of kieselguhr,
38 parts of kaolin,
30 parts of Champagne chalk.

The active substance mentioned is mixed and finely milled with the carriers and distributing agents. A wettable powder having excellent wettability and suspendibility is obtained. Suspensions of any concentration of active substance desired can be obtained from such wettable powders by dilution with water. Such suspensions serve for the treatment of cultivated plants and of materials and objects which are subject to attack by fungi and bacteria.

A wettable powder of similar satisfactory properties is obtained by replacing the active substance used in the composition described above by the following active substance:

5 - isopropoxycarbonylmethyl - thio - 4 - chloro - 1,2 - dithiol-3-one.

Emulsion concentrates

To produce (a) a 5%, (b) a 10% and (c) a 15% emulsion concentrate, the following components are used:

(a) 5 parts of 4-chloro-5-phenylsulfonyl-1,2-dithiol-3-one,
40 parts of dimethyl formamide,
50 parts of petroleum (boiling range 230–270°),
5 parts of a composite emulsifyer consisting of the Ca salt of dodecylbenzene sulfonic acid and a condensation product of ethylene oxide and ricinus oil (e.g., "Emullat WK," Union Chimique Belge, S.A., Brussels).

(b) 10 parts of 4-(4'-tolyl)-5-methylsulfonyl-1,2-dithiol-3-one,
35 parts of dimethyl formamide,
50 parts of petroleum (boiling range 230–270°), Emulsion concentrates—Continued 5 parts of a composite emulsifyer consisting of the Ca salt of dodecylbenzene sulfonic acid and a condensation product of ethylene oxide and ricinus oil (e.g., "Emullat WK," Union Chimique, S.A. Brussels).

(c) 15 parts of 4-chloro-5-(β-naphthylsulfonyl)-1,2-dithiol-3-one,
27 parts of dimethyl formamide,
53 parts of petroleum (boiling range 230–270°),
5 parts of a composite emulsifyer consisting of the Ca salt of dodecylbenzene sulfonic acid and a condensation product of ethylene oxide and ricinus oil (e.g., "Emullat WK," Union Chimique, S.A., Brussels).

The active substance concerned is dissolved in petroleum or dimethyl formamide and then the composite emulsifier is added to this solution. Emulsion concentrates are obtained which can be diluted with water to any concentration desired. Such emulsions are suitable for the treatment of cultivated plants.

Emulsion concentrates of similar satisfactory properties are obtained by replacing the active substance used in the compositions described under (a) to (c), supra, by the following active substances, respectively:

(a') 5-benzyl-sulfinyl-4-chloro-1,2-dithiol-3-one,
(b') 5-(2'-chloroethyl)-sulfinyl-4-chloro-1,2-dithiol-3-one,
(c') 5-[4'-methyl - thiazolyl-(2')-thio]-4-chloro-1,2-dithiol-3-one.

We claim:
1. A compound of the formula

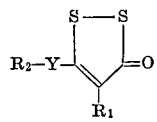

wherein Y represents S, —SO—, or —SO$_2$—; R$_1$ represents phenyl or halogen of atomic number up to 35; and R$_2$ represents pyridyl, N-oxidopyridyl, or pyridyl-lower alkyl.

2. A compound as defined in claim 1, which is 5-[N-oxido-pyridyl-(2')-thio]-4-chloro-1,2-dithiol-3-one.

3. A compound as defined in claim 1, which is (4-chloro-1,2-dithiol-3-on-5-yl)-[(2'-pyridyl)-methyl]-sulphide.

References Cited

UNITED STATES PATENTS 3,109,772  11/1963  Carosino _____ 260—327

OTHER REFERENCES

Lowy et al.: Introduction to Organic Chemistry, sixth ed., p. 214, Wiley, New York, 1945.

ALAN L. ROTMAN, Primary Examiner

U.S. Cl. X.R.

260—247.1, 248, 293.4 302, 306.7, 307, 309.2, 309.6, 326.82, 332.3; 424—249, 263, 267, 269, 270, 272, 273, 274, 277